United States Patent
Ocak et al.

(10) Patent No.: US 12,327,126 B2
(45) Date of Patent: Jun. 10, 2025

(54) METHODS FOR OPERATION OF A DEVICE, BOOTSTRAP SERVER AND NETWORK NODE

(71) Applicant: Telefonaktiebolaget LM Ericsson (publ), Stockholm (SE)

(72) Inventors: Mert Ocak, Helsinki (FI); Ari Keränen, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/282,539

(22) PCT Filed: Oct. 5, 2018

(86) PCT No.: PCT/EP2018/077125
§ 371 (c)(1),
(2) Date: Apr. 2, 2021

(87) PCT Pub. No.: WO2020/069753
PCT Pub. Date: Apr. 9, 2020

(65) Prior Publication Data
US 2021/0342163 A1 Nov. 4, 2021

(51) Int. Cl.
*G06F 9/4401* (2018.01)
*H04L 47/70* (2022.01)

(52) U.S. Cl.
CPC ............ *G06F 9/4416* (2013.01); *H04L 47/82* (2013.01)

(58) Field of Classification Search
CPC .... G06F 9/4416; G06F 11/1417; H04L 67/12; H04L 47/82; H04L 29/12235; H04L 29/12226; H04L 2029/06054; H04L 67/34; H04L 61/2015; H04L 67/1002; H04L 61/2023; H04W 4/70
See application file for complete search history.

(56) References Cited

U.S. PATENT DOCUMENTS

2002/0078188 A1* 6/2002 Anand ................ G06F 9/4416
714/E11.073
2004/0168174 A1* 8/2004 Baker ................ H04L 67/1095
719/310

(Continued)

OTHER PUBLICATIONS

International Search Report and Written Opinion mailed May 29, 2019 for International Patent Application No. PCT/EP2018/077125, 12 pages.

(Continued)

*Primary Examiner* — Jaweed A Abbaszadeh
*Assistant Examiner* — Brynne J. Corcoran
(74) *Attorney, Agent, or Firm* — Sage Patent Group

(57) ABSTRACT

Methods for operating a device, a Bootstrap server and a network node are disclosed. The method for operating a device includes requesting a Bootstrap data object from a node reachable via the network, the Bootstrap data object including an identification of a device management server, receiving a Bootstrap data object from a node reachable via the network, configuring a data object on the device in accordance with the received Bootstrap data object, and requesting registration with the device management server identified in the received Bootstrap data object. Also disclosed are a device, a Bootstrap server and a network node.

26 Claims, 10 Drawing Sheets

(56) References Cited

U.S. PATENT DOCUMENTS

| | | |
|---|---|---|
| 2005/0071677 A1* | 3/2005 | Khanna .................. H04L 67/34 726/4 |
| 2005/0180326 A1* | 8/2005 | Goldflam ............ H04L 63/0227 370/231 |
| 2007/0083748 A1* | 4/2007 | Erickson ............... G06F 9/4416 713/2 |
| 2010/0174810 A1* | 7/2010 | Cain ..................... G06F 9/4416 709/222 |
| 2013/0238885 A1* | 9/2013 | Tripathi .............. H04L 47/6205 713/2 |
| 2014/0244989 A1* | 8/2014 | Hiltgen ................. G06F 9/4416 713/2 |
| 2014/0304323 A1* | 10/2014 | Alnas ...................... H04W 4/50 709/203 |
| 2016/0150001 A1* | 5/2016 | Liu ..................... H04L 67/1097 709/223 |
| 2017/0041287 A1 | 2/2017 | Pak et al. |
| 2017/0048336 A1 | 2/2017 | Novo Diaz et al. |
| 2018/0152541 A1 | 5/2018 | Mathison et al. |
| 2020/0059353 A1* | 2/2020 | Liu ..................... H04L 67/1021 |

OTHER PUBLICATIONS

OmaSpecWorks, "Lightweight Machine to Machine Technical Specification: Core", Candidate Version: 1.1—Jun. 12, 2018, Open Mobile Alliance, OMA-TS-LightweightM2M_Core-V1_1-20180612-C, 142 pages.

OmaSpecWorks, "Lightweight Machine to Machine Technical Specification: Transport Bindings", Approved Version: 1.1.1—Jun. 17, 2019, Open Mobile Alliance, OMA-TS-LightweightM2M_Transport-V1_1_1-20190617-A, 75 pages.

Shelby, Z. et al., "The Constrained Application Protocol (COAP)", Internet Engineering Task Fore (IETF), Request for Comments: 7252, Category: Standards Track, ISSN: 2070-1721, Universitaet Bremen TZI, Jun. 2014, 112 pages.

Open Mobile Alliance, "Lightweight Machine to Machine Technical Specification" Approved Version 1.0, OMA-TS-LightweightM2M-V1_0-20170208-A, Feb. 8, 2017, 138 pages.

* cited by examiner

METHODS FOR OPERATION OF A DEVICE, BOOTSTRAP SERVER AND NETWORK NODE

CROSS REFERENCE TO RELATED APPLICATIONS

This application is a 35 U.S.C. § 371 national stage application of PCT International Application No. PCT/EP2018/077125 filed on Oct. 5, 2018, the disclosures and content of which are incorporated by reference herein in their entirety.

TECHNICAL FIELD

The present disclosure relates to a method for operating a device that is operable to connect to a network, and to methods for operating a Bootstrap server and a network node. The present disclosure also relates to a device, a Bootstrap server, a network node and to a computer program and a computer program product configured, when run on a computer to carry out methods performed in a device, a Bootstrap server and a network node.

BACKGROUND

The "Internet of Things" (IoT) refers to devices enabled for communication network connectivity, so that these devices may be remotely managed, and data collected or required by the devices may be exchanged between individual devices and between devices and application servers. Such devices, examples of which may include sensors and actuators, are often, although not necessarily, subject to limitations on processing power, storage capacity, energy supply, device complexity and/or network connectivity, imposed by their operating environment or situation. Such devices may consequently be referred to as constrained devices. Constrained devices often connect to the core network via gateways using short range radio technologies. Information collected from the constrained devices may then be used to create value in cloud environments.

The constrained nature of many IoT devices has prompted the design and implementation of new protocols and mechanisms. The Constrained Application Protocol (CoAP), as defined in RFC 7252, is one example of a protocol designed for IoT applications in constrained nodes and constrained networks. CoAP provides a request-response based RESTful communication architecture between constrained nodes or between constrained nodes and nodes on the Internet. CoAP can easily be integrated to the web and web services by translating CoAP messages to HTTP.

The Open Mobile Alliance (OMA) Lightweight Device Management (DM) protocol, also known as the Lightweight Machine to Machine protocol (LWM2M), is a light and compact device management protocol that may be used for managing IoT devices and their resources. LWM2M is designed to run on top of CoAP and is required to support User Datagram Protocol (UDP) transport bindings. LWM2M should also support Short Message Service (SMS) transport bindings and may additionally support Transmission Control Protocol (TCP) binding, Transport Layer Security (TLS), and/or non-IP transport bindings such as Long Range Wide Area Network (LoRaWAN) binding and/or Cellular Internet of Things (CIoT) binding. LWM2M is therefore compatible with any constrained device which supports CoAP. LWM2M defines three components:

LWM2M Client: contains several LWM2M data objects with resources. A LWM2M Server can execute commands on the resources to manage the client, including reading, deleting or updating resources. LWM2M Clients are generally run in constrained devices.

LWM2M Server (management Server): manages LWM2M Clients by sending management commands to them.

LWM2M Bootstrap Server: is used to manage the initial configuration parameters of LWM2M Clients during bootstrapping of a device.

In order to maintain communication between the above discussed components, the following LWM2M interfaces are defined:

Bootstrapping: LWM2M Bootstrap Server sets the initial configuration on a LWM2M Client when the client device bootstraps. Four different bootstrapping methods are currently defined, including: Factory Bootstrap, Bootstrap from Smartcard, Client Initiated Bootstrap and Server Initiated Bootstrap.

Client Registration: LWM2M Client registers to one or more LWM2M Servers when bootstrapping is completed.

Device Management and Service Enablement: LWM2M Server can send management commands to LWM2M Clients to perform several management actions on LWM2M resources of the client. An access control object of the client determines the set of actions the server can perform.

Information Reporting: As a feature of the CoAP Observe-Notify mechanism, LWM2M Clients can initiate communication to a LWM2M Server and report information in the form of notifications.

A constrained device must be configured during bootstrap for a specific environment and/or domain before being deployed to use that domain's LWM2M Server. A new LWM2M server can be added to the access control list (ACL) of the device in several ways as set out in the OMA DM LWM2M standard. During bootstrapping, a LWM2M Bootstrap Server deletes or updates existing resources on the client, including updating client security information with the assigned LWM2M Server address and credentials for the LWM2M client. In this manner, the assigned LWM2M Server is given management rights on the client. The flow of CoAP messages during the bootstrapping process is defined in the OMA DM LWM2M standard.

Typically, a LWM2M Bootstrap Server is a single server endpoint to which all bootstrapping clients try to connect. This may for example be the bootstrap server of a manufacturer of IoT devices. When a device starts for the first time, it contacts the Bootstrap Server with a CoAP POST request that causes the Bootstrap Server to perform a series of CoAP GETs, POSTs, PUTs and DELETEs to set up a proper object structure and security credentials on the device. When the Bootstrap Server has finished configuring the device, it performs a last CoAP POST to signal to the LWM2M client on the device that it can contact the Management Server to commence registration.

The above described arrangement for bootstrap of IoT devices has certain disadvantages. A Bootstrap Server is usually shared between a large number of IoT devices, and is required to run bootstrap operations (including a minimum 3 CoAP methods) with each device. The Bootstrap Server can therefore easily become a bottleneck, particularly during simultaneous deployment of a large number of devices. The Bootstrap Server also represents a single point of failure, which can lead to problems in deployment. In addition, the Bootstrap Server must be accessible by all the devices it is to bootstrap, meaning the devices require Internet connectivity, or the Bootstrap Server must be in the same Local Area Network (LAN) as the devices. Finally, the continuous communication between the Bootstrap Server and multiple IoT devices consumes a considerable amount of network bandwidth and power in both the Bootstrap Server and the devices themselves.

SUMMARY

It is an aim of the present disclosure to provide a method, apparatus and computer readable medium which at least partially address one or more of the challenges discussed above.

According to a first aspect of the present disclosure, there is provided a method for operating a device that is operable to connect to a network. The method, performed in the device, comprises requesting a Bootstrap data object from a node reachable via the network, the Bootstrap data object comprising an identification of a device management server. The method further comprises receiving a Bootstrap data object from a node reachable via the network, configuring a data object on the device in accordance with the received Bootstrap data object, and requesting registration with the device management server identified in the received Bootstrap data object.

According to different examples of the present disclosure, the method may comprise receiving a Bootstrap data object from the same node from which a Bootstrap data object was requested. Alternatively, the method may comprise receiving a Bootstrap data object from a different node to that from which a Bootstrap data object was requested, for example if a request forwarding arrangement is in place between nodes reachable via the network, as discussed in further detail below. According to further examples of the present disclosure, the method may comprise requesting a specific Bootstrap data object which is identified in the request. The method may further comprise receiving the Bootstrap data object that was requested or receiving a different Bootstrap data object. Alternatively, the request may not specify a specific bootstrap data object, and the received Bootstrap data object may therefore not be the Bootstrap data object that was requested.

According to examples of the present disclosure, the device may be operable to run a device management client, and configuring a data object on the device may comprise configuring a data object provisioned in the device management client. According to examples of the present disclosure, the device may comprise a Machine to Machine (M2M) device, the device management client may be a LWM2M client and the device management server may be a LWM2M server. According to examples of the present disclosure, the M2M device may comprise a constrained device and/or the network may comprise a constrained network. For the purposes of the present disclosure, a constrained device comprises a device which conforms to the definition set out in section 2.1 of RFC 7228 for "constrained node". According to the definition in RFC 7228, a constrained device is a device in which "some of the characteristics that are otherwise pretty much taken for granted for Internet nodes at the time of writing are not attainable, often due to cost constraints and/or physical constraints on characteristics such as size, weight, and available power and energy. The tight limits on power, memory, and processing resources lead to hard upper bounds on state, code space, and processing cycles, making optimization of energy and network bandwidth usage a dominating consideration in all design requirements. Also, some layer-2 services such as full connectivity and broadcast/multicast may be lacking". Constrained devices are thus clearly distinguished from server systems, desktop, laptop or tablet computers and powerful mobile devices such as smartphones. A constrained device may for example comprise a Machine Type Communication device, a battery powered device or any other device having the above discussed limitations. Examples of constrained devices may include sensors measuring temperature, humidity and gas content, for example within a room or while goods are transported and stored, motion sensors for controlling light bulbs, sensors measuring light that can be used to control shutters, heart rate monitor and other sensors for personal health (continuous monitoring of blood pressure etc.) actuators and connected electronic door locks. A constrained network correspondingly comprises "a network where some of the characteristics pretty much taken for granted with link layers in common use in the Internet at the time of writing are not attainable", and more generally, may comprise a network comprising one or more constrained devices as defined above.

According to examples of the present disclosure, configuring a data object on the device in accordance with the received Bootstrap data object may comprise writing the identification of a device management server from the Bootstrap data object as a value of a data object on the device.

According to examples of the present disclosure, the Bootstrap data object may further comprise an object specification describing at least one of an object structure and object resource values. According to such examples, configuring a data object on the device in accordance with the received Bootstrap data object may comprise at least one of creating a data object on the device having the described object structure, and/or writing the described object resource values into a data object on the device.

According to examples of the present disclosure, the object specification may describe object structure using any appropriate mechanism including LWM2M, Sensor Measurement Lists (SenML) or Type-Length-Value (TLV) formats. According to different examples of the present disclosure one or more data objects may be created and/or values may be written into one or more data objects.

According to examples of the present disclosure, the Bootstrap data object may further comprise at least one of security credentials for the identified device management server and/or an indication of how security credentials for the identified device management server may be obtained. According to such examples, configuring a data object on the device in accordance with the received Bootstrap data object may comprise writing the security credentials for the identified device management server as a value of a data object on the device and requesting registration with the management server identified in the received Bootstrap data object may comprise requesting registration using the security credentials for the identified device management server.

According to examples of the present disclosure, if the Bootstrap data object comprises an indication of how security credentials for the identified device management server may be obtained, the method may further comprise obtaining the security credentials in accordance with the indication.

According to examples of the present disclosure, the Bootstrap data object may be encrypted, and the method may further comprise decrypting the Bootstrap data object.

If the Bootstrap data object is specific to the device, the Bootstrap data object may be encrypted with a public identity of the device and/or of a device management client running on the device. If the Bootstrap data object is not specific to the device, meaning multiple devices may share a Bootstrap data object, symmetric cryptography may be used for encryption of the Bootstrap data object. According to examples of the present disclosure, the Bootstrap data object may be integrity protected, and the method may further comprise verifying the integrity protection. Integrity protection may be using credentials of a Bootstrap Server that created the Bootstrap data object as discussed below.

According to examples of the present disclosure, the method may further comprise obtaining an address of a node provisioned with a Bootstrap data object, and requesting a Bootstrap data object from a node reachable via the network may comprise sending a request message to the obtained address. The address may be the address of a specific node or may be a multicast address.

According to examples of the present disclosure, obtaining an address of a node provisioned with a Bootstrap data object may comprise at least one of retrieving a dedicated multicast address for Bootstrap data object provisioned nodes from a memory and/or querying a Resource Directory for nodes having exposed a Bootstrap data object as a discoverable resource.

According to examples of the present disclosure, the node reachable via the network may comprise at least one of a Bootstrap Server cache, a Bootstrap server proxy node, a file server, a peer client device.

According to examples of the present disclosure, requesting a Bootstrap data object from a node reachable via the network may comprises sending to the node reachable via the network a Bootstrap data object request message, the Bootstrap data object request message comprising a characteristic of the device. According to examples of the present disclosure, the characteristic may be unique to the device or may be shared with other devices.

According to examples of the present disclosure, the characteristic may comprise at least one of a device type, a device identifier, a representation of device capabilities, and/or a representation of data objects configured on the device.

According to examples of the present disclosure, the Bootstrap data object may further comprise a representation of a prerequisite object configuration that should be existing on the device before configuration of a data object on the device in accordance with the Bootstrap data object. According to such examples, the method may further comprise comparing a representation of an existing object configuration on the device with the representation of a prerequisite object configuration from the received Bootstrap data object.

According to examples of the present disclosure, if the comparison indicates a match, the method may further comprise proceeding to configure a data object on the device in accordance with the received Bootstrap data object. According to examples of the present disclosure, if the comparison does not indicate a match, the method may further comprise at least one of requesting a new Bootstrap data object from a node reachable via the network and/.or sending a Bootstrapping request to a Bootstrapping Server.

According to examples of the present disclosure, requesting a new Bootstrapping data object from a node reachable via the network may comprise at least one of obtaining a new address of a node provisioned with a Bootstrap data object and sending a new request message to the new obtained address and/or sending a new Bootstrap data object request message, the new Bootstrap data object request message comprising a different characteristic of the device.

According to examples of the present disclosure, different combinations of the above two options may be envisaged, and such combinations may in some examples depend upon the nature of the address to which the request message is sent. In some examples, a new message may be sent to the same multicast or unicast address with a different characteristic. In other examples, a new message may be sent to a new unicast or multicast address. The new message may include the same characteristic as the original request message or may comprise a different characteristic.

According to examples of the present disclosure, the step of obtaining a new address of a node provisioned with a Bootstrap data object may take place before or after the failed comparison. For example, an initial step of obtaining an address may comprise obtaining multiple addresses, one of which may be selected for a first request message, and another of the obtained addresses may be selected for a second request message. In other examples, the new address may be obtained via a new discovery process performed after the failed comparison. In such examples, the device may seek to discover nodes provisioned with a Bootstrap data object corresponding to a first characteristic of the device during a first discovery process, and may seek to discover nodes provisioned with a Bootstrap data object corresponding to a second characteristic of the device during a second discovery process conducted after a failed comparison.

According to examples of the present disclosure, the representation of a prerequisite object configuration that should be existing on the device may comprise at least one of a representation of data objects that must exist on the device and/or a representation of data objects that must not exist on the device.

According to examples of the present disclosure, the representation may comprise at least one of a checksum and/or a bloom filter. According to further examples of the present disclosure, the representation may additionally or alternatively comprise a list and/or hash.

According to examples of the present disclosure, a match may comprises a similarity between the representation of an existing object configuration on the device and the representation of a prerequisite object configuration that is above a threshold level.

According to examples of the present disclosure, a match may therefore comprise an exact match, such that the existing and prerequisite object structures are identical, or may comprise an approximate match, such that the existing and prerequisite object structures are "close enough".

According to examples of the present disclosure, the method may further comprise, after requesting a Bootstrap data object from a node reachable via the network, checking for a request failure condition and, on occurrence of the request failure condition, performing at least one of requesting a new Bootstrap data object from a node reachable via the network and/or sending a Bootstrapping request to a Bootstrapping Server.

According to examples of the present disclosure, the request failure condition may comprise at least one of receipt of a message indicating that no Bootstrap data object is available and/or expiry of a request timer.

According to examples of the present disclosure, the nature of the request failure condition may depend upon the nature of the request. For example a request message sent to a multicast address will not in most cases trigger a return message indicating that no Bootstrap data object is available, so the failure condition will be expiry of a request timer. According to examples of the present disclosure, the action following occurrence of the failure condition may also depend upon the nature of the request, whether the request included a characteristic and if so, whether an alternative characteristic for the device is available etc. The options discussed above for a further request following a failed comparison may also apply to a further request following failure to receive a Bootstrap data object following the initial request.

According to another aspect of the present disclosure, there is provided a method for operating a Bootstrap server. The method, performed in the Bootstrap server, comprises generating a Bootstrap data object corresponding to a device that is operable to connect to a network, the Bootstrap data object comprising an identification of a device management server. The method further comprises distributing the generated Bootstrap data object to a node reachable via the network.

According to examples of the present disclosure, a Bootstrap data object corresponding to a device that is operable to connect to a network may comprise a Bootstrap data object which identifies a device management server that is to be assigned to the device.

According to examples of the present disclosure, a single Bootstrap data object may therefore be device specific or may correspond to multiple different devices.

According to examples of the present disclosure, the Bootstrap data object may further comprise an object specification describing at least one of an object structure and/or object resource values for configuration of a data object on the device.

According to examples of the present disclosure, the object specification may describe object structure using any appropriate mechanism including LWM2M, Sensor Measurement Lists (SenML) or Type-Length-Value (TLV) formats.

According to examples of the present disclosure, the Bootstrap data object may further comprise at least one of security credentials for the identified device management server and/or an indication of how security credentials for the identified device management server may be obtained.

According to examples of the present disclosure, the method may further comprise encrypting the Bootstrap data object. If the Bootstrap data object is specific to the device, the Bootstrap data object may be encrypted with a public identity of the device and/or of a device management client running on the device. If the Bootstrap data object is not specific to the device, meaning multiple devices may share a Bootstrap data object, symmetric cryptography may be used for encryption of the Bootstrap data object. According to examples of the present disclosure, the method may further comprise integrity protecting the Bootstrap data object using credentials of a Bootstrap server.

According to examples of the present disclosure, the node reachable via the network may comprise at least one of a Bootstrap Server cache, a Bootstrap server proxy node, a file server and/or a peer client device.

According to examples of the present disclosure, generating a Bootstrap data object corresponding to a device that is operable to connect to a network may comprise labelling the Bootstrap data object with a characteristic of the device.

According to examples of the present disclosure, the label may be used by a node to which the Bootstrap data object is delivered to identify an appropriate Bootstrap data object to send to a requesting device.

According to examples of the present disclosure, the characteristic may comprise at least one of a device type, a device identifier, a representation of device capabilities and/or a representation of data objects configured on the device.

According to examples of the present disclosure, the Bootstrap data object may further comprise a representation of a prerequisite object configuration that should be existing on the device before configuration of a data object on the device in accordance with the Bootstrap data object.

According to examples of the present disclosure, the representation of a prerequisite object configuration that should be existing on the device may comprise at least one of a representation of data objects that must exist on the device and/or a representation of data objects that must not exist on the device.

According to examples of the present disclosure, the representation may comprise at least one of a checksum and/or a bloom filter. According to further examples of the present disclosure, the representation may additionally or alternatively comprise a list and/or hash.

According to another aspect of the present disclosure, there is provided a method for operating a network node. The method, performed in the network node, comprises receiving a request for a Bootstrap data object from a device operable to connect to a network, determining whether a Bootstrap data object corresponding to the device is available on the network node, and, if a Bootstrap data object corresponding to the device is available on the network node, sending the Bootstrap data object corresponding to the device to the device, the Bootstrap data object comprising an identification of a device management server.

According to different examples of the present disclosure, a single Bootstrap data object may correspond to a plurality of devices operable to join a network, or a Bootstrap data object may be device specific, such that each Bootstrap data object corresponds to only one specific device. In some examples, a single Bootstrap data object may correspond to all devices operable to join a network, and so determining whether a Bootstrap data object corresponding to the device is available on the network node may comprise determining whether any Bootstrap data object is available on the node.

According to examples of the present disclosure, the method may further comprise receiving a Bootstrap data object from a Bootstrap server.

According to examples of the present disclosure, multiple different Bootstrap data objects may be received at a host from one or more different Bootstrap servers.

According to examples of the present disclosure, the method may further comprise exposing the received Bootstrap data object to a Resource Directory as a discoverable resource.

According to examples of the present disclosure, the method may further comprise, if a Bootstrap data object corresponding to the device is not available on the network node, performing at least one of ignoring the request, sending a message to the device indicating that no Bootstrap data object is available and/or forwarding the request.

According to examples of the present disclosure, the request may be forwarded according to a predefined forwarding table, so allowing the request to reach other network nodes which may be provisioned with a suitable Bootstrap data object.

According to examples of the present disclosure, the request may comprise a Bootstrap data object request message, the Bootstrap data object request message comprising a characteristic of the device. According to such examples, determining whether a Bootstrap data object corresponding to the device is available on the network node may comprise determining whether a Bootstrap data object having a label that matches the received characteristic is stored on the network node.

According to examples of the present disclosure, the characteristic may be unique to the device, such as a device identity, or may be shared with other devices, such as a device type.

According to examples of the present disclosure, the characteristic may comprise at least one of a device type, a device identifier, a representation of device capabilities and/or a representation of data objects configured on the device.

According to examples of the present disclosure, the network node may comprise at least one of a Bootstrap Server cache, a Bootstrap server proxy node, a file server and/or a peer client device.

According to another aspect of the present disclosure, there is provided a computer program comprising instructions which, when executed on at least one processor, cause the at least one processor to carry out a method according to any one of the preceding aspects or examples of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

According to another aspect of the present disclosure, there is provided a device that is operable to connect to a network, the device comprising a processor and a memory. The memory contains instructions executable by the processor such that the device is operable to request a Bootstrap data object from a node reachable via the network, the Bootstrap data object comprising an identification of a device management server, receive a Bootstrap data object from a node reachable via the network, configure a data object on the device in accordance with the received Bootstrap data object, and request registration with the management server identified in the received Bootstrap data object.

According to examples of the present disclosure, the device may be further operable to carry out a method according to any one of the preceding aspects or examples of the present disclosure.

According to another aspect of the present disclosure, there is provided a device that is operable to connect to a network. The device is adapted to request a Bootstrap data object from a node reachable via the network, the Bootstrap data object comprising an identification of a device management server, receive a Bootstrap data object from a node reachable via the network, configure a data object on the device in accordance with the received Bootstrap data object, and request registration with the management server identified in the received Bootstrap data object.

According to examples of the present disclosure, the device may be further adapted to carry out a method according to any one of the preceding aspects or examples of the present disclosure.

According to another aspect of the present disclosure, there is provided a Bootstrap server, the bootstrap server comprising a processor and a memory. The memory contains instructions executable by the processor such that the bootstrap server is operable to generate a Bootstrap data object corresponding to a device that is operable to connect to a network, the Bootstrap data object comprising an identification of a device management server, and distribute the generated Bootstrap data object to a node reachable via the network.

According to examples of the present disclosure, the Bootstrap server may be further operable to carry out a method according to any one of the preceding aspects or examples of the present disclosure.

According to another aspect of the present disclosure, there is provided a Bootstrap server. The bootstrap server is adapted to generate a Bootstrap data object corresponding to a device that is operable to connect to a network, the Bootstrap data object comprising an identification of a device management server, and distribute the generated Bootstrap data object to a node reachable via the network.

According to examples of the present disclosure, the Bootstrap server may be further adapted to carry out a method according to any one of the preceding aspects or examples of the present disclosure.

According to another aspect of the present disclosure, there is provided a network node, the network node comprising a processor and a memory. The memory contains instructions executable by the processor such that the bootstrap server is operable to receive a request for a Bootstrap data object from a device operable to connect to a network, determine whether a Bootstrap data object corresponding to the device is available on the network node, an, if a Bootstrap data object corresponding to the device is available on the network node, send the Bootstrap data object corresponding to the device to the device, the Bootstrap data object comprising an identification of a device management server.

According to examples of the present disclosure, the network node may be further operable to carry out a method according to any one of the preceding aspects or examples of the present disclosure.

According to another aspect of the present disclosure, there is provided a network node. The network node is adapted to receive a request for a Bootstrap data object from a device operable to connect to a network, determine whether a Bootstrap data object corresponding to the device is available on the network node, and, if a Bootstrap data object corresponding to the device is available on the network node, send the Bootstrap data object corresponding to the device to the device, the Bootstrap data object comprising an identification of a device management server.

According to examples of the present disclosure, wherein the network node may be further operable to carry out a method according to any one of the preceding aspects or examples of the present disclosure.

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

Aspects of the present disclosure provide methods for operating a device, Bootstrap server and network node which, together, may enable a device to obtain information enabling the device to bootstrap on a network without directly contacting a Bootstrap server. According to examples of the present disclosure, information that in a standard bootstrapping process may be sent to a device by a Bootstrap server may instead be contained within a Bootstrap data object, which data object may be distributed to one or more network nodes. The Bootstrap data object may then be obtained by a device seeking to bootstrap on the network, and may provide the device with the information required for the device to bootstrap. At a minimum, this information may comprise an identification of a device management server for the device. The device may configure a data object stored on the device in accordance with the information contained in the Bootstrap data object, for example writing the identification of the device management server into an appropriate data object on the device. The device may then request registration with the device management server identified in the received Bootstrap data object. Encapsulating Bootstrap information in a Bootstrap data object, and distributing the Bootstrap data object to one or more network nodes for provision to a device, may thus enable a device to bootstrap without direct contact with a Bootstrap server. In this manner, the need for an extensive message exchange between the device and Bootstrap server may be avoided, with consequent savings of both bandwidth usage in the network and power in the device and Bootstrap server. Additionally, the requirement for the device to be able to directly contact the bootstrap server (either via Internet connectivity or by placing the Bootstrap server in the same LAN as the device) may be relaxed.

Figure 1:
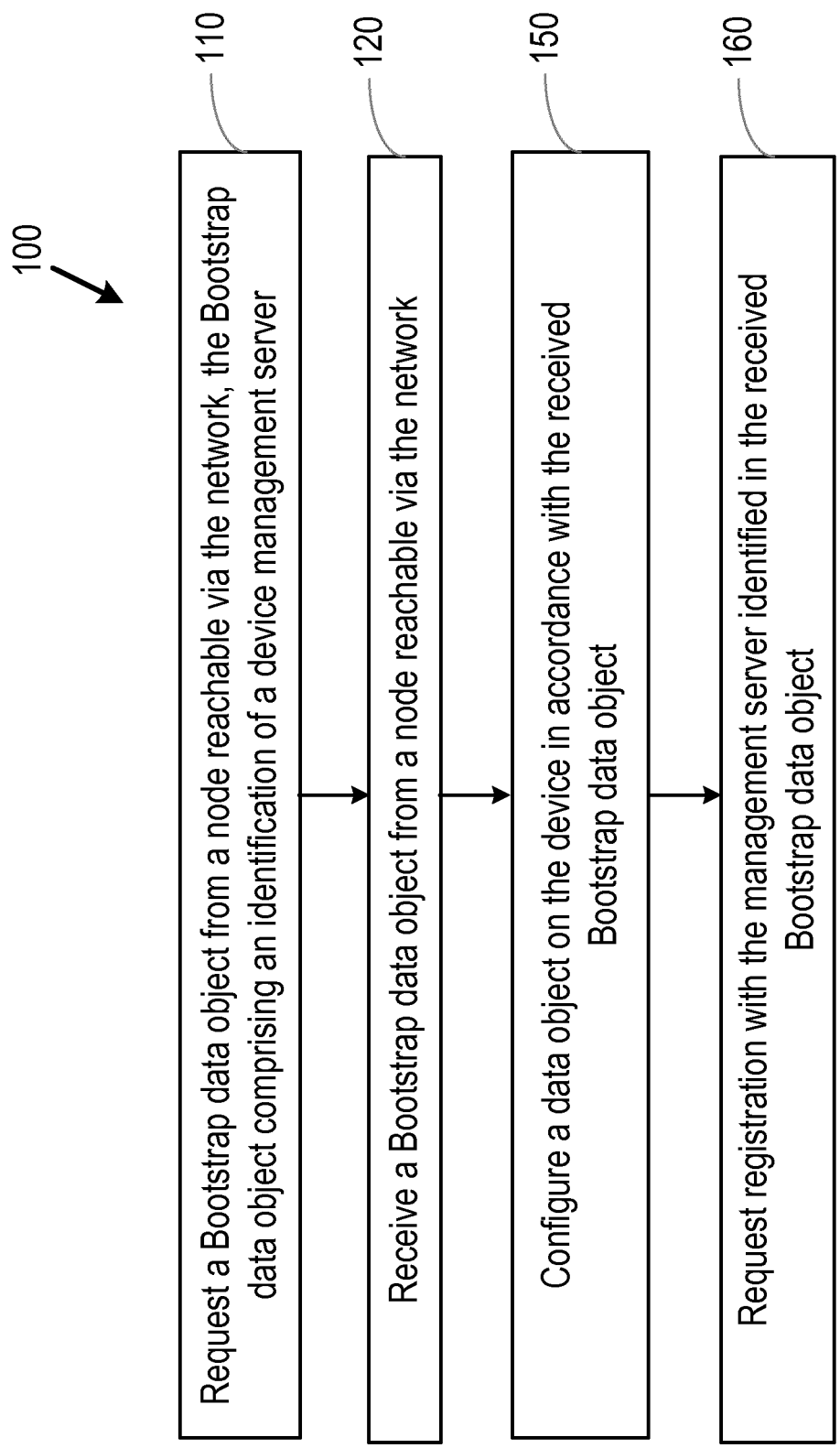
FIG. 1 is a flow chart illustrating process steps in a method for operating a device.

FIG. 1 is a flow chart illustrating process steps in a method 100 for operating a device that is operable to connect to a network in accordance with aspects of the present disclosure. The device conducting the method may be a constrained device as set out above. The device may be operable to run a LWM2M client. The device may be configured to communicate using a RESTful protocol including for example CoAP or HTTP, or another IoT protocol, such as MQTT. Referring to FIG. 1, in a first step 110, the device requests a Bootstrap data object from a node reachable via the network, the Bootstrap data object comprising an identification of a device management server. In step 120, the device receives a Bootstrap data object from a node reachable via the network. The node from which the Bootstrap data object is received may in some examples be the same node as that to which the request for a Bootstrap data object was directed. In other examples, the Bootstrap data object may be received from a different node to the one to which the request for a Bootstrap data object was directed. In step 150, the device configures a data object on the device in accordance with the received Bootstrap data object, and may in some examples configure a plurality of data objects on the device. The data objects may for example be provisioned on a LWM2M client running on the device. In step 160, the device requests registration with the device management server identified in the received Bootstrap data object. As discussed in further detail below with reference to FIGS. 3 and 4, the Bootstrap data object may have been generated by a Bootstrap server and distributed to one or more network nodes by the Bootstrap server.

Figure 2A:
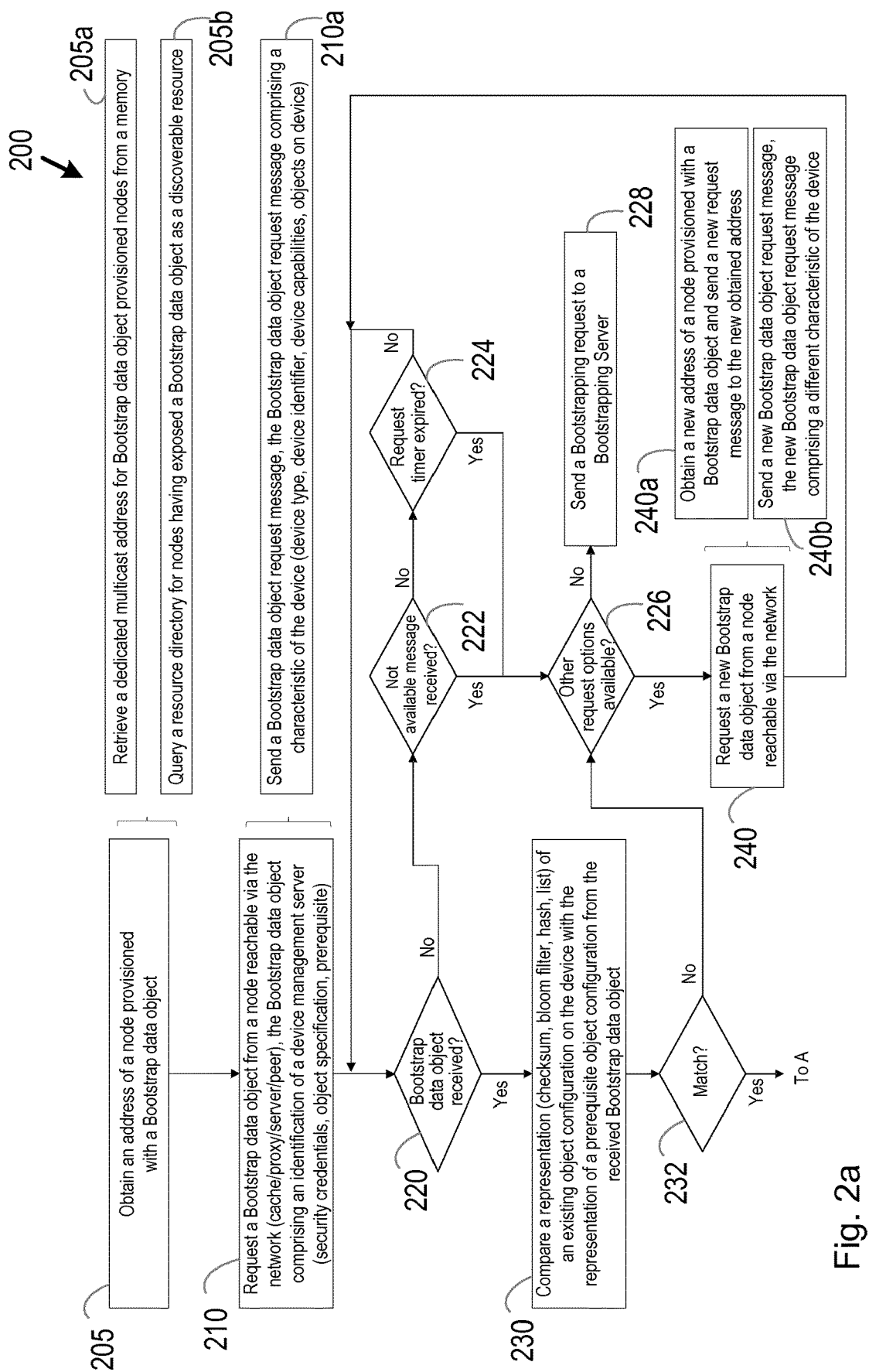
FIGS. 2a and 2b are a flow charts illustrating process steps in another example of method for operating a device.
Figure 2B:
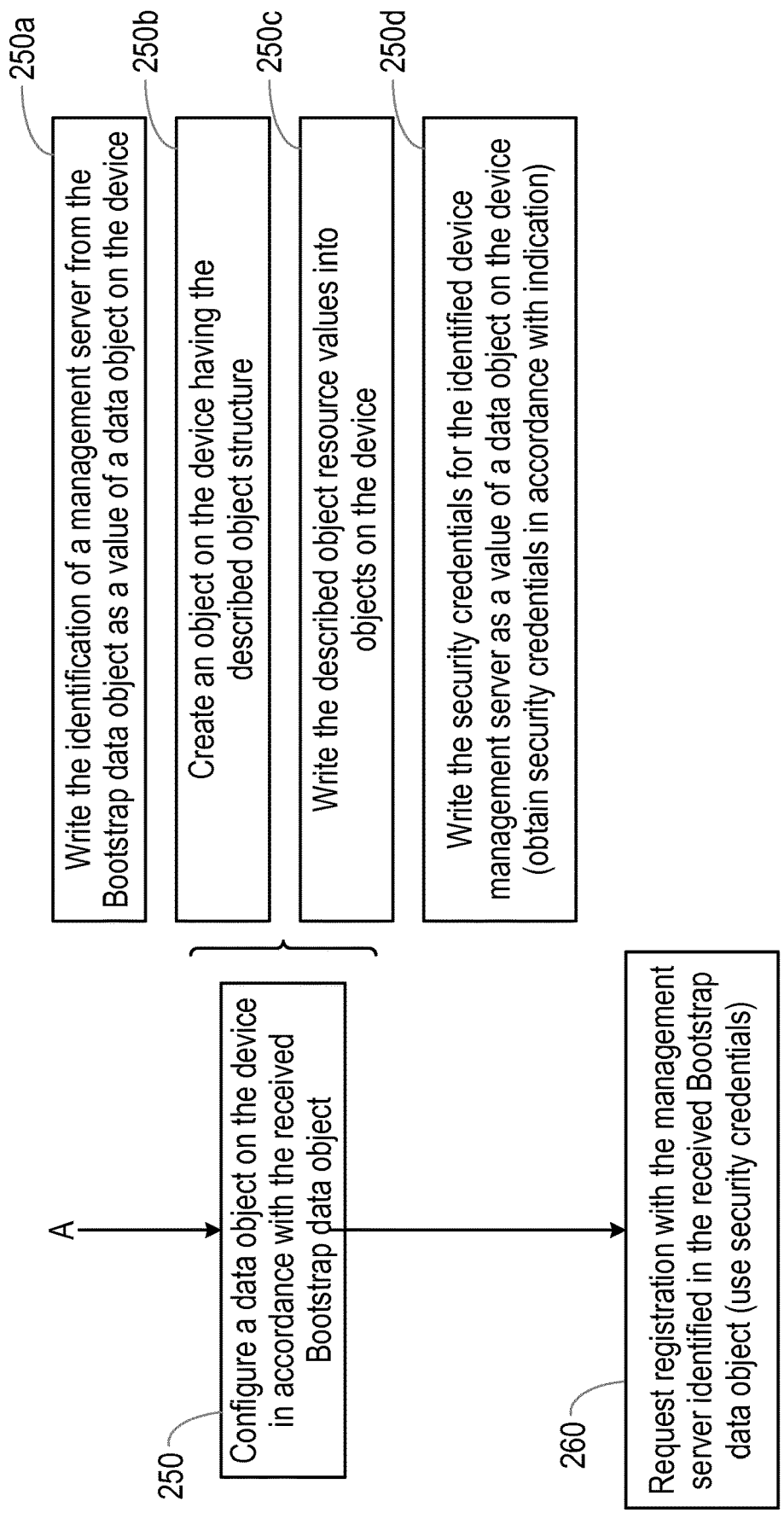

FIGS. 2*a* and 2*b* show a flow chart illustrating process steps in another example of a method 200 for operating a device that is operable to connect to a network in accordance with aspects of the present disclosure. The steps of the method 200 illustrate one way in which the steps of the method 100 may be implemented and supplemented in order to achieve the above discussed and additional functionality. As for the method of FIG. 1 above, the device conducting the method may be a constrained device as set out above. The device may be operable to run a LWM2M client. The device may be configured to communicate using a RESTful protocol including for example CoAP or HTTP, or another IoT protocol, such as MQTT.

Referring to FIG. 2*a*, in a first step 205, the device obtains an address of a node provisioned with a Bootstrap data object. The node may be reachable via the network to which the device is operable to connect. As illustrated in FIG. 2*a*, the step of obtaining an address may comprise retrieving a dedicated multicast address for Bootstrap data object provisioned nodes from a memory at step 205*a*. A multicast address of this nature may be pre-defined and may for example be configured in the device at manufacture. Such an address may ensure that a message directed to the address is received at all network nodes which may be provisioned with a Bootstrap data object. In this manner, a single Bootstrap request message from the device may be sufficient to contact all nodes which may be in a position to provide the required Bootstrap data object for the device. In other examples, a unicast address for a dedicated network node that will be provisioned with an appropriate Bootstrap data object may be pre-defined and configured in the device, such that it may be retrieved at step 205. In still further examples, the step of obtaining an address may comprise querying a Resource Directory in step 205*b* for nodes having exposed a Bootstrap data object as a discoverable resource.

The network node which is reachable via the network may comprise a Bootstrap Server cache or a Bootstrap server proxy node. In some examples, the node may comprise a file server, which may be a generic file server. The node may alternatively comprise a peer client device. The peer client device may in some examples have obtained the Bootstrap data object, and configured one or more of its data objects in accordance with the Bootstrap data object. The peer client device may then store the Bootstrap data object to be able to provide it to other devices on request. In further examples the peer client device may not have used the Bootstrap data object for its own configuration, but may still have the Bootstrap data object for some other reason, and so be in a position to provide it to other devices. As discussed in further detail below with reference to FIG. 4, the network node may, on obtaining the Bootstrap data object, expose the Bootstrap data object to a Resource Directory within the network, so enabling devices to discover the Bootstrap data object as an available resource on the network node via a discovery interface. In some examples a specific content format may be used for a Bootstrap data object, facilitating discovery of the Bootstrap data object through the Resource Directory.

As discussed in further detail below, a Bootstrap data object may be shared between many, and in some cases all, devices operable to join a network, or may be specific to a certain group of devices or to a single device. The step 205 of obtaining an address of a node provisioned with a Bootstrap data object may therefore comprise obtaining an address of a node provisioned with a specific Bootstrap data object that corresponds to the device, or may comprise obtaining an address for any node that is provisioned with a Bootstrap data object. It will be appreciated that specific multicast addresses may be pre-defined and/or different Bootstrap data objects may be differentiated in a Resource Directory to allow for appropriate discovery. Other methods for obtaining an address of a node provisioned with a Bootstrap data object may be envisaged.

Having obtained an address of a node provisioned with a Bootstrap data object, the device then requests a Bootstrap data object in step 210. As illustrated in FIG. 2a, this may comprise sending a Bootstrap data object request message to the obtained address in step 210a. The message may be sent to a single node, in examples in which the obtained address is a unicast address, or may be sent to a plurality of nodes, in examples in which the obtained address is a multicast address. As illustrated in step 210a, the Bootstrap data object request message may comprise a characteristic of the device, which may assist with identifying a Bootstrap data object that corresponds to the device. In examples in which any Bootstrap data object will be appropriate for the device, the characteristic may be omitted from the request. If included, the characteristic may be device specific, or may be shared between one or more devices. For example, the characteristic may comprise an end point name of the device or some other device identify, which may be associated with the device itself or with a device management client, such as a LWM2M client, running on the device. In other examples the characteristic may be a device type such as temperature sensor, humidity sensor, actuator etc., or may be one or more device capabilities. In further examples, the characteristic may comprise a representation of data objects configured on the device, which representation may be matched against a prerequisite object configuration specified in a Bootstrap data object to enable identification by a network node of a correct bootstrap data object to be returned to the device.

As discussed above with reference to FIG. 1, a Bootstrap data object comprises an identification of a device management server, which may be a LWM2M server. The Bootstrap data object may additionally comprise security credentials for the LWM2M server or an indication of how to obtain such credentials, an object specification describing at least one of an object structure and object resource values, and/or a prerequisite object configuration on the device. These additional elements that may be comprised within the Bootstrap data object are discussed in further detail below, with reference to step 250 of the method 200.

In step 220, the device checks whether or not a Bootstrap data object has been received. If a Bootstrap data object has not been received, the device then checks at step 222 whether or not a message has been received indicating that a Bootstrap data object is not available. As discussed below with reference to FIG. 4, such a message may be sent if the request sent in step 210 is sent to a unicast address, and if the node to which the request is addressed either does not have any Bootstrap data object, or does not have a Bootstrap data object corresponding to the device, as indicated by the characteristic included with the request. If a message indicating that a Bootstrap data object is not available has not been received, the device then checks whether or not a request time has expired in step 224. If the request for a Bootstrap data object was sent to a multicast address, then nodes receiving the request will only reply if they are able to satisfy the request. In such an example, an error/object not available message will not be received, and so a request timer may be used to ensure that a device does not remain endlessly waiting for a Bootstrap data object that never arrives. This may also be appropriate to cover cases in which not all network nodes can be guaranteed to return an error/object not available message in appropriate circumstances, even when receiving a unicast message.

If no message indicating that a Bootstrap data object is not available has been received, but the request timer has not yet expired, then the device returns to step 220, to check whether a Bootstrap data object has been received. If a message indicating that a Bootstrap data object is not available has been received, or if the request timer has timed out, then the device proceeds, at step 226 to determine whether or not other request options are available. The nature of other request options that may be available may depend upon the specifics of the request that was sent in step 210. For example, if the request that was sent in step 210 includes a characteristic of the device, the device may be able to send a new request with a different characteristic. Alternatively or in addition, the device may be able to send a new request to a different address. These options are discussed in further detail below.

If no other request options are available to the device, the device may then send a Bootstrapping request to a Bootstrapping server in step 228. Bootstrapping according to existing mechanisms may thus represent a fall back option should a device not be able to obtain a suitable Bootstrap data object to allow the device to self-configure.

If the device determines at step 226 that other request options are available to it, then the device proceeds at step 240 to request a new Bootstrap data object from a node reachable via the network. As illustrated in FIG. 2a, this may comprise obtaining a new address of a node provisioned with a Bootstrap data object and sending a new request message to the new obtained address in step 240a, and/or sending a new Bootstrap data object request message comprising a different characteristic of the device in step 240b. The step of obtaining a new address of a node provisioned with a Bootstrap data object may take place before or after the sending of the first request in step 210. For example, the initial step 205 of obtaining an address may comprise obtaining multiple addresses, one of which may be selected for a first request message, and another of the obtained addresses may be selected for a second request message in step 240. In other examples, the new address may be obtained via a new discovery process performed after the first request message failed to result in a Bootstrap data object being received at the device.

In some examples, both the steps 240a and 240b may be performed. The device may seek to discover nodes provisioned with a Bootstrap data object corresponding to a first characteristic of the device during a first discovery process, and may seek to discover nodes provisioned with a Bootstrap data object corresponding to a second characteristic of the device during a second discovery process conducted after the first request message failed to result in a Bootstrap data object being received at the device. For example, the device may send a first request message in step 210 with which is included the device's end point name. If no Bootstrap data object is received following this message, the device may send a new message at step 240 including instead a device type, or an object configuration on the device. The device having failed to obtain a Bootstrap data object that is specific to the device may thus seek to obtain a Bootstrap data object that is specific to a group of devices to which the device belongs. In still further examples, the device may send a new message at step 240 that includes no characteristic of the device, and which therefore merely seeks to obtain any Bootstrap data object.

It will be appreciated that different combinations of steps 240*a* and 240*b* may be envisaged, and such combinations may in some examples depend upon the nature of the address to which the request message is sent. In some examples, a new message may be sent to the same multicast or unicast address with a different characteristic. In other examples, a new message may be sent to a new unicast or multicast address. The new message may include the same characteristic as the original request message or may comprise a different characteristic.

Having sent a new request for a Bootstrap data object in step 240, the device then returns to step 220 to determine whether or not a Bootstrap data object has been received. It will be appreciated that multiple repetitions of the above discussed steps may be performed, exhausting all possible request options, before a device falls back on sending a Bootstrapping request to a Bootstrapping server. In other examples, a device may be configured such that only one request option is available, or that regardless of other request options available, the device falls back to sending a Bootstrapping request to a Bootstrapping server after a threshold number of attempts to obtain a Bootstrap data object, which threshold number may be any integer such as one, two or three attempts etc.

Referring still to FIG. 2*a*, if at step 220 the device determines that a Bootstrap data object has been received, it may proceed to step 230. The Bootstrap data object may be received from the node to which the request in step 210 or step 240 was sent or may be received from a different node. For example, the request in step 210 or 240 may have been sent to a multicast address, in which case any one or more of the plurality of network nodes monitoring such an address may respond. In further examples, a forwarding mechanism may be in place such that a network node receiving a request message on either a multicast or a unicast address, and which is unable to supply a Bootstrap data object in accordance with the request, may forward the request message to another node or nodes. A node receiving a forwarded request and able to supply an appropriate Bootstrap data object may respond to the message, resulting in the device receiving a Bootstrap data object from a node that is different to the node or nodes from which the device requested a Bootstrap data object.

In step 230, the device may compare a representation of an existing object configuration on the device with a representation of a prerequisite object configuration from the received Bootstrap data object. As mentioned above, in addition to an identification of a device management server, the Bootstrap data object may include a representation of a prerequisite object configuration that should exist on the device before configuration of a data object on the device in accordance with the Bootstrap data object. If present, this representation is checked against the device's existing object configuration in step 230, to determine whether or not the Bootstrap data object can be used by the device for its configuration. The representation may in some examples comprise at least one of a checksum and a bloom filter, and may additionally or alternatively comprise a hash or a list. In one example, if the exact object configuration, such as the exact LWM2M object/resource ID set, that must exist in the device is known, a checksum of the set may be used in the Bootstrap data object to indicate what the right set should be. This may be used instead of a list of all object/resource IDs that would consume more space. If, alternatively or in addition, there is a set of IDs that should not be in the device, a bloom filter can be used to efficiently indicate those IDs. A sensible trade-off between efficiency and the chance of false positives can be considered acceptable as the device can fall-back to requesting bootstrapping from a Bootstrap server in the event of a mismatch, as discussed below. It will be appreciated that the representation of the prerequisite object configuration may in some examples be sent with the request for a Bootstrap data object, and may thus be used by a network node to identify a suitable Bootstrap data object for sending to the device. In such examples the check at step 230 may be maintained or omitted, according to implementation choices made by a network administrator.

In step 232, the device determines whether or not its object configuration matches the prerequisite object configuration from the received Bootstrap data object. A match may be defined as a level of similarity over a threshold level. The threshold level may be set by a network administrator, and may require an exact match, such that the representations of the prerequisite object configuration and existing object configuration on the device are identical, or may only require a partial match, such that the similarity between the prerequisite object configuration and the object configuration on the device is "good enough".

If the check at step 232 determines that there is not a match. i.e. that the comparison step 230 has revealed that the prerequisite object configuration for the received Bootstrap data object is not present on the device, then the device may proceed or return to step 226, and determine whether any other request options are available. Any combination of the steps 228, 240, 240*a* and/or 240*b* may then be performed to send a new request for a Bootstrap data object or to fall back to sending a Bootstrapping request to a Bootstrap server as appropriate and as discussed in full above.

Referring now to FIG. 2*b*, if at step 232 the device determines that there is a match i.e. that the comparison step 230 has revealed that the prerequisite object configuration for the received Bootstrap data object is present on the device, then the device may proceed to configure a data object on the device in accordance with the received Bootstrap data object in step 250. It will be appreciated that step 250 may comprise configuring one or more data objects on the device, including creating data objects, deleting data objects and/or writing one or more values into one or more data objects.

As illustrated in FIG. 2*b*, in one example, configuring a data object on the device in accordance with the received Bootstrap data object may comprise writing the identification of a management server from the Bootstrap data object as a value of a data object on the device in step 250*a*. For example, the identified device management server may be added to an Access Control List (ACL) of the device. This may have the effect of giving the identified device management server management rights on the device. Additional sub steps performed as part of configuration step 250 may depend upon the information contained in the received Bootstrap data object.

As noted above, in some examples, the received Bootstrap data object may comprise an object specification describing at least one of an object structure and object resource values. According to such examples, configuring a data object on the device in step 250 may comprise at least one of creating a data object on the device having the described object structure in step 250b, and/or writing the described object resource values into a data object on the device in step 250c. The object specification may describe the object structure using any appropriate mechanism including LWM2M, Sensor Measurement Lists (SenML) or Type-Length-Value (TLV) formats. According to different examples of the present disclosure, one or more data objects may be created and/or values may be written into one or more data objects. For example, a data object existing on the device may be replaced by one or more new data objects created according to the object specification, new data objects may be added to existing data objects on the device, and one or more values such as resource values may be written into data objects existing or newly created on the device to conform to the object specification.

The Bootstrap data object may further comprise at least one of security credentials for the identified device management server and/or an indication of how security credentials for the identified device management server may be obtained. According to such examples, configuring a data object on the device in accordance with the received Bootstrap data object may comprise writing the security credentials for the identified device management server as a value of a data object on the device in step 250d. If the Bootstrap data object comprises an indication of how security credentials for the identified device management server may be obtained, the method may further comprise obtaining the security credentials in accordance with the indication.

In some examples, the Bootstrap data object may be encrypted, and the method may further comprise decrypting the Bootstrap data object. Decryption may be performed before the comparison step 230, or before the configuration step, 250, if comparison step 230 is not performed. If the Bootstrap data object is specific to the device, the Bootstrap data object may be encrypted with a public identity of the device and/or of a device management client running on the device. If the Bootstrap data object is not specific to the device, meaning multiple devices may share a Bootstrap data object, symmetric cryptography may be used for encryption of the Bootstrap data object. If the identities of the devices that will request the Bootstrap data object are not known at the time of creation of the Bootstrap data object, then only an indication of how to retrieve the security credentials (for example an identification of an Authentication server) may be included in the Bootstrap data object, and hence the Bootstrap data object may be left unencrypted. The Bootstrap data object may be integrity protected, and the method may further comprise verifying the integrity protection. Integrity protection may use credentials of a Bootstrap Server that created the Bootstrap data object as discussed below.

Referring still to FIG. 2b, after configuring one or more data objects of the device in step 250, the device then requests registration with the management server identified in the received Bootstrap data object in step 260. This may comprise requesting registration using the security credentials for the identified device management server, if such credentials, or an indication of how to obtain them, are included in the received Bootstrap data object.

Figure 3:
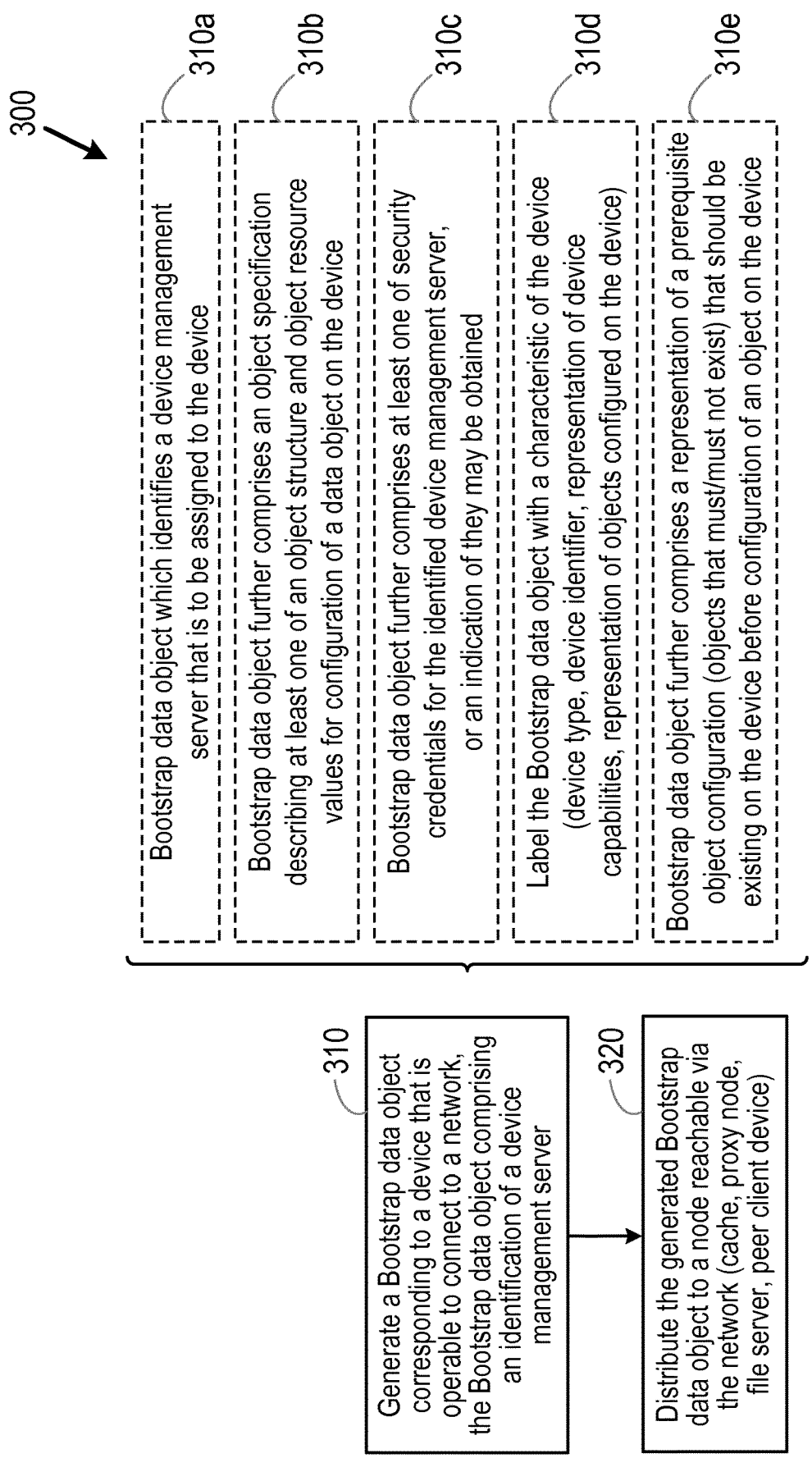
FIG. 3 is a flow chart illustrating process steps in a method for operating a Bootstrap server.
Figure 4:
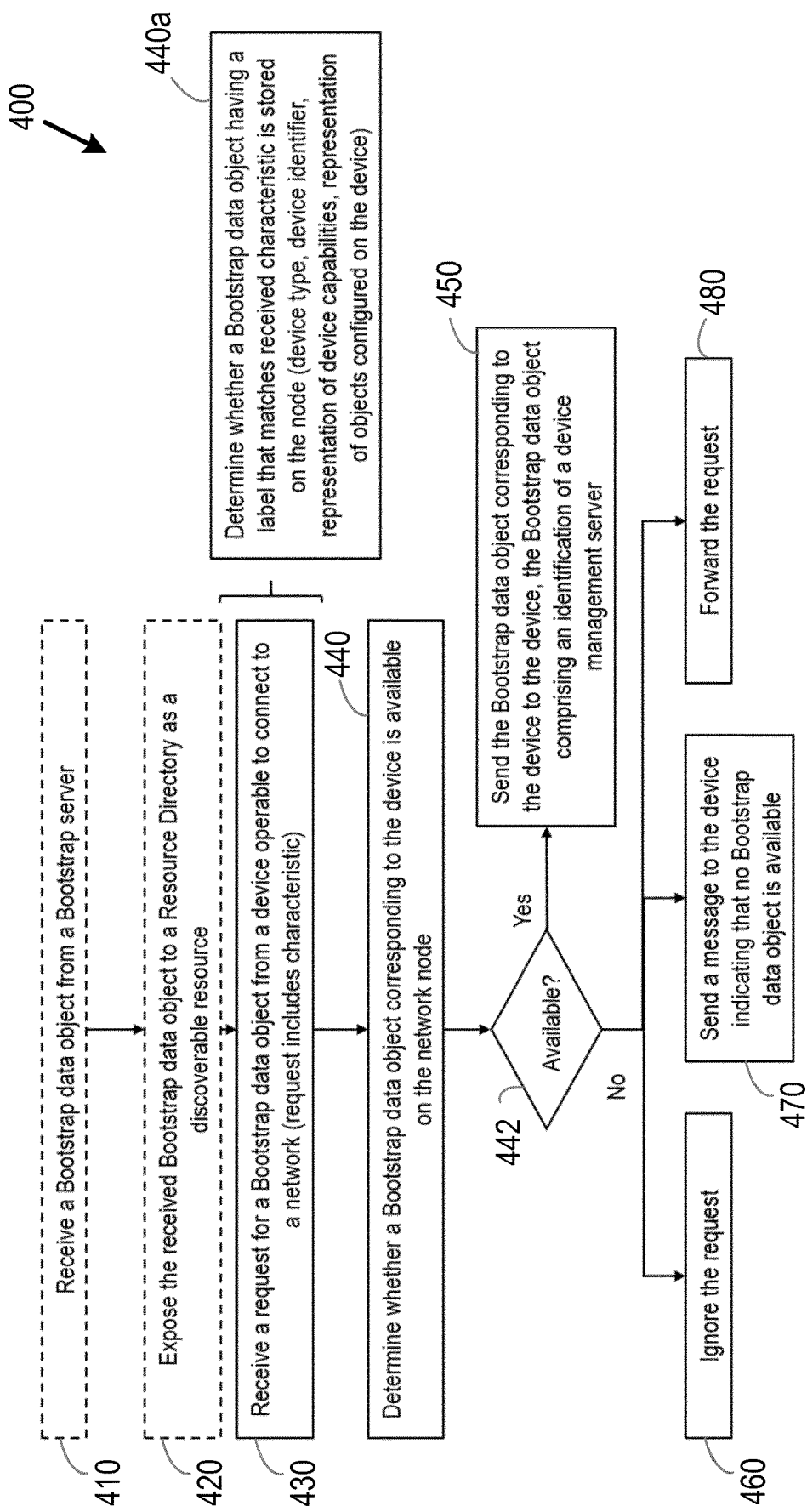
FIG. 4 is a flow chart illustrating process steps in a method for operating a network node.

The method 200 of FIG. 2 thus illustrates an example of different ways in which a device may request, receive and use a Bootstrap data object to configure at least one data object on the device and obtain an identification of a device management server with which the device may register. FIGS. 3 and 4 illustrate process steps of methods at a Bootstrap server and a network node which may facilitate the method 200 of FIG. 2 and/or the method 100 of FIG. 1.

FIG. 3 is a flow chart illustrating process steps in a method 300 for operating a Bootstrap server. The Bootstrap server may be a LWM2M Bootstrap server. The method, performed in the Bootstrap server, comprises in a first step 310 generating a Bootstrap data object corresponding to a device that is operable to connect to a network. As discussed above, the Bootstrap data object comprises an identification of a device management server. The method further comprises distributing the generated Bootstrap data object to a node reachable via the network in step 320.

As illustrated in step 310a, a Bootstrap data object corresponding to a device that is operable to connect to a network may comprise a Bootstrap data object which identifies a device management server that is to be assigned to the device. The same device management server may be assigned to multiple devices, and thus in some examples a single Bootstrap data object may correspond to multiple different devices. In further examples a Bootstrap data object may correspond to a particular group of devices, which group is to be assigned to the identified device management server. As discussed below in further detail, the Bootstrap data object may include additional information. The additional information may result in the Bootstrap data object corresponding to one individual device, to a group of devices, for example of a specific type or function or having specific capabilities or existing configuration, or may correspond to all devices operable to join a particular network.

As illustrated in step 310b, generating a Bootstrap data object may comprise generating such that the generated Bootstrap data object further comprises an object specification describing at least one of an object structure and/or object resource values for configuration of a data object on the device. The object specification may describe an object structure using any appropriate mechanism including LWM2M, SenML or TLV formats.

As illustrated in step 310c, generating a Bootstrap data object may comprise generating such that the generated Bootstrap data object further comprises at least one of security credentials for the identified device management server and/or an indication of how security credentials for the identified device management server may be obtained.

As illustrated in step 310d, generating a Bootstrap data object corresponding to a device in step 310 may further comprise labelling the Bootstrap data object with a characteristic of the device. The label may be used by a node to which the Bootstrap data object is delivered to identify an appropriate Bootstrap data object to send to a requesting device, as discussed below with reference to FIG. 4. The characteristic used to label the Bootstrap data object may or may not be device specific, and may comprise at least one of a device type, a device identifier, a representation of device capabilities and/or a representation of data objects configured on the device.

As illustrated in step 310e, generating a Bootstrap data object may comprise generating such that the generated Bootstrap data object further comprises a representation of a prerequisite object configuration that should exist on the device before configuration of a data object on the device in accordance with the Bootstrap data object. The representation of a prerequisite object configuration may comprise at least one of a representation of data objects that must exist on the device and/or a representation of data objects that must not exist on the device. The representation may comprise at least one of a checksum and/or a bloom filter, and may alternatively or additionally comprise a list and/or hash.

The method 300 may in some examples further comprise encrypting the Bootstrap data object. If the Bootstrap data object is specific to a device, the Bootstrap data object may be encrypted with a public identity of the device and/or of a device management client running on the device. If the Bootstrap data object is not specific to the device, meaning multiple devices may share a Bootstrap data object, symmetric cryptography may be used for encryption of the Bootstrap data object. Client specific keys may be encrypted using each client's public identity. The method 300 may in some examples also comprise integrity protecting the Bootstrap data object using credentials of the Bootstrap server.

As discussed above, in step 320, the method 300 comprises distributing by the Bootstrap server the generated Bootstrap data object to a node reachable via the network. The node may comprise at least one of a Bootstrap Server cache, a Bootstrap server proxy node, a file server and/or a peer client device. In some examples the generated Bootstrap data object may be distributed to multiple nodes and in some examples, multiple Bootstrap data objects may be generated and distributed to one or more nodes. In some examples, the distribution of one or more generated Bootstrap data objects to one or more nodes may be combined with configuring the nodes to listen to a particular multicast address. In other examples, nodes to receive one or more generated Bootstrap data objects may be selected according to an existing addressing configuration.

FIG. 3 thus illustrates different examples of how a Bootstrap server may generate and distribute a Bootstrap data object to a node. The receiving node may then supply the Bootstrap data object to a corresponding device on request, as illustrated in FIG. 4.

FIG. 4 is a flow chart illustrating process steps in a method 400 for operating a network node. The network node may be a Bootstrap Server cache, a Bootstrap server proxy node, a file server and/or a peer client device. The method, performed in the network node, may initially comprise receiving a Bootstrap data object from a Bootstrap server in step 410. It will be appreciated that multiple different Bootstrap data objects may be received at a network node from one or more different Bootstrap servers. The method may further comprise exposing the received Bootstrap data object to a Resource Directory as a discoverable resource in step 420.

In step 430, the method comprises receiving a request for a Bootstrap data object from a device operable to connect to a network. The request may be a unicast request message addressed to a URI of the node. In other examples the request may be sent to a multicast address which the network node is monitoring. In further examples, the request may be forwarded to the network node by another node according to a pre-established forwarding behaviour. As illustrated in step 430, the request may comprise a Bootstrap data object request message, the Bootstrap data object request message including a characteristic of the device. The characteristic may be unique to the device or may be shared with other devices. The characteristic may comprise at least one of a device type, a device identifier, a representation of device capabilities and/or a representation of data objects configured on the device.

In step 440, the method comprises determining whether a Bootstrap data object corresponding to the device is available on the network node. A single Bootstrap data object may correspond to a plurality of devices operable to join a network, or a Bootstrap data object may be device specific, such that each Bootstrap data object corresponds to only one specific device. In some examples, a single Bootstrap data object may correspond to all devices operable to join a network, and so determining whether a Bootstrap data object corresponding to the device is available on the network node may comprise determining whether any Bootstrap data object is available on the network node. In examples in which the request received in step 430 includes a characteristic, the determining step 440 may comprise, in step 440a, determining whether a Bootstrap data object having a label that matches the received characteristic is stored on the network node.

If in step 442 it is established that a Bootstrap data object corresponding to the device is available on the network node, the method 400 further comprises sending the Bootstrap data object corresponding to the device to the device in step 450, the Bootstrap data object comprising an identification of a device management server. If a Bootstrap data object corresponding to the device is not available on the network node, the network node may perform one or more of several actions, as illustrated in steps 460, 470 and 480. In step 460, the network node may simply ignore the request. This action may be appropriate for example of the request was received via a multicast address. In such cases, the request will have been received by other network nodes, one of which may able to supply an appropriate Bootstrap data object. In step 470, the network node may send a message to the device indicating that no Bootstrap data object is available. In step 480, the network node may forward the request, for example according to a predefined forwarding table, so allowing the request to reach other network nodes which may be provisioned with a suitable Bootstrap data object.

The methods 100 and/or 200, 300 and 400 thus cooperate to enable the creation and distribution of a Bootstrap data object to a device. The Bootstrap data object provides the device with information enabling the device to configure one or more data objects on the device and to identify the correct device management server for registration of the device. Delivery of the Bootstrap data object to a device is illustrated schematically in FIG. 5.

Figure 5:
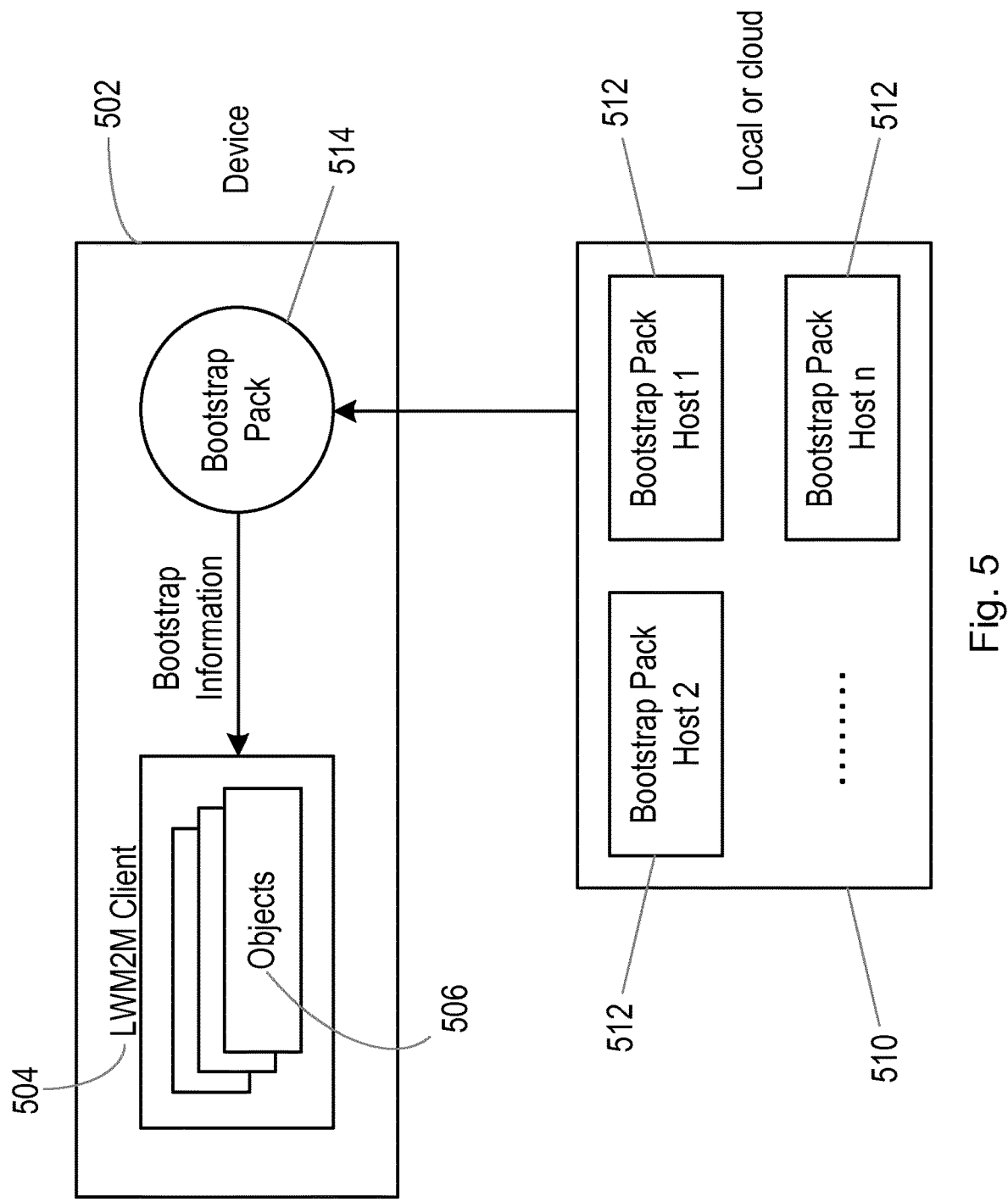
FIG. 5 is a schematic representation of delivery of a Bootstrap data object.

Referring to FIG. 5, an example device 502 is running a LWM2M client 504 which is configured with a plurality of data objects 506. A plurality of network nodes 512, referred to in the Figures as Hosts, have each been provisioned with a Bootstrap data object, referred to in the Figure as a Bootstrap Pack. The plurality of network nodes may be comprised within a deployment 510 which is either local, cloud based or some combination of local nodes and cloud nodes. On receipt of a request for a Bootstrap data object, at least one of the network nodes 512 supplies an appropriate Bootstrap data object 514 to the device 502. The device 502 extracts from the received Bootstrap data object the information that it requires in order to bootstrap on the network. This information may at a minimum comprise an identification of a device management server for the device. The device is then able to configure one or more of its data objects using the information from the Bootstrap data object, so achieving a state that would otherwise by arrived at following an exchange of Bootstrapping messages with a Bootstrapping server.

Figure 6:
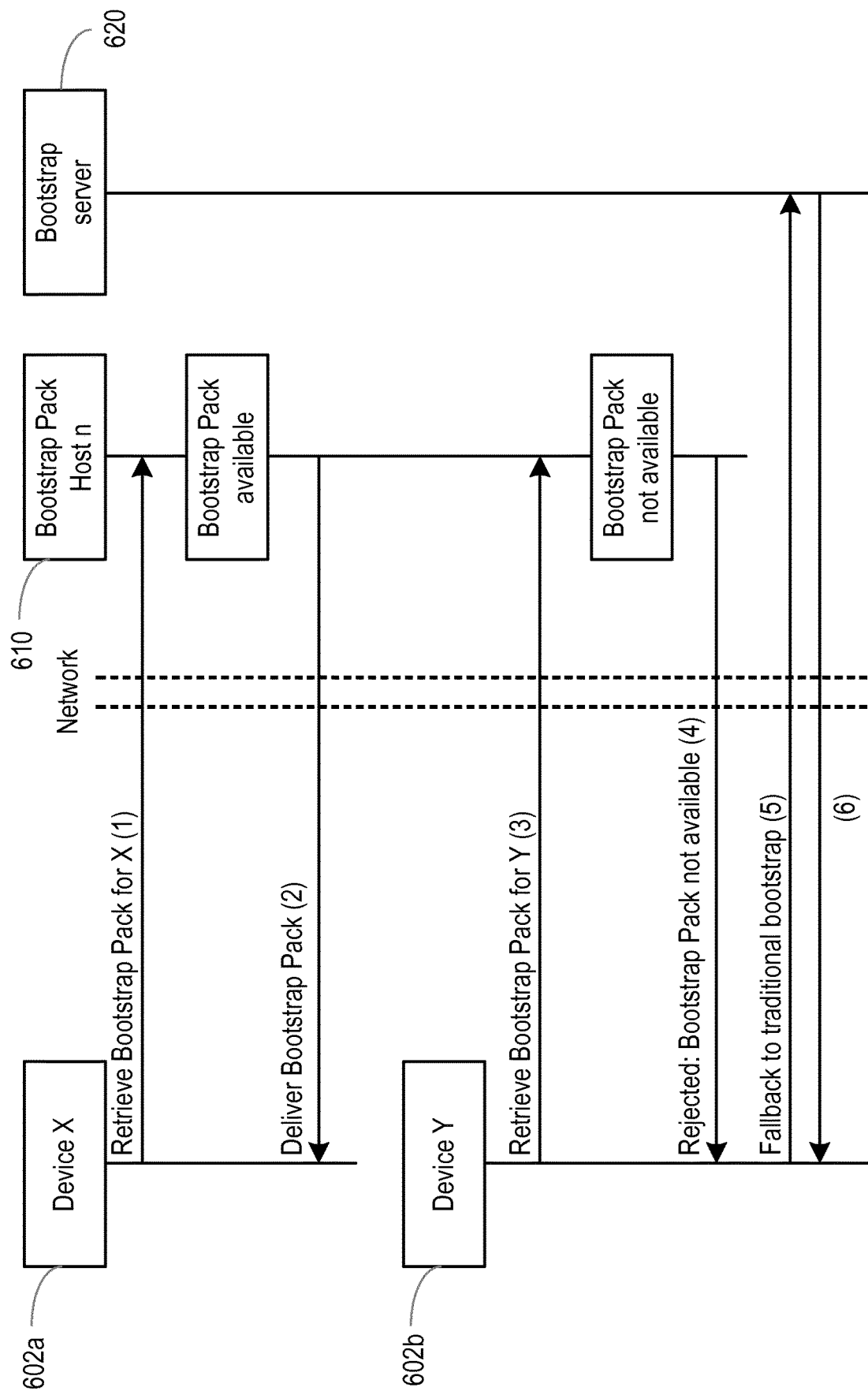
FIG. 6 is a message flow diagram.

A message exchange for two devices X and Y according to examples of the present disclosure is illustrated in FIG. 6. In message 1, device X 602a sends a request message for a Bootstrap data object, referred to as a Bootstrap pack, which corresponds to the device X. The requested Bootstrap data object may be device specific or may correspond to a plurality of devices, including device X 602a. Network node 610, referred to in the Figure as Host n, receives the message, either directly or indirectly. The network node 610 determines that a Bootstrap data object corresponding to device X is available on the network node and delivers the Bootstrap data object to device X in message 2. In message 3, device Y 602b sends a request message for a Bootstrap data object that corresponds to the device Y. The requested Bootstrap data object may be device specific or may correspond to a plurality of devices, including device Y 602b. Network node 610, receives the message, either directly or indirectly. The network node 610 determines that a Bootstrap data object corresponding to device Y is not available and sends, in message 4, a rejection message indicating that a Bootstrap data object is not available. Device Y then falls back to sending a Bootstrap request message to a Bootstrap server 620 in order to conduct a standard Bootstrapping procedure.

Figure 7:
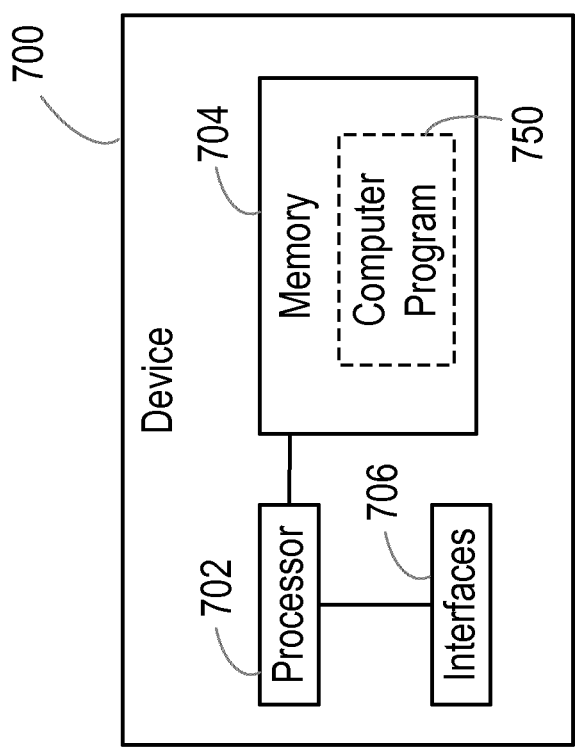
FIG. 7 is a block diagram illustrating functional units in a device.

As discussed above, the methods 100, 200 may be performed by a device, which may in some examples be a constrained device. FIG. 7 is a block diagram illustrating an example device 700 which may implement the methods 100, 200 according to examples of the present disclosure, for example on receipt of suitable instructions from a computer program 750. Referring to FIG. 7, the device 700 comprises a processor or processing circuitry 702, a memory 704 and interfaces 706. The memory 704 contains instructions executable by the processor 702 such that the device 700 is operative to conduct some or all of the steps of the method 100 and/or 200. The instructions may also include instructions for executing one or more telecommunications and/or data communications protocols. The instructions may be stored in the form of the computer program 750. In some examples, the processor or processing circuitry 702 may include one or more microprocessors or microcontrollers, as well as other digital hardware, which may include digital signal processors (DSPs), special-purpose digital logic, etc. The processor or processing circuitry 702 may be implemented by any type of integrated circuit, such as an Application Specific Integrated Circuit (ASIC), Field Programmable Gate Array (FPGA) etc. The memory 704 may include one or several types of memory suitable for the processor, such as read-only memory (ROM), random-access memory, cache memory, flash memory devices, optical storage devices, solid state disk, hard disk drive etc.

Figure 8:
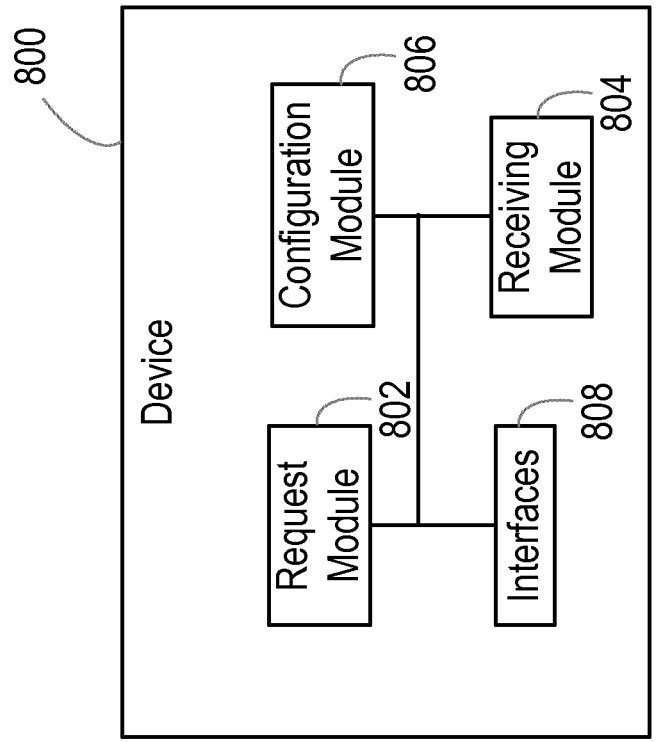
FIG. 8 is a block diagram illustrating functional units in another example of device.

FIG. 8 illustrates functional units in another example of device 800 which may execute examples of the methods 100, 200 of the present disclosure, for example according to computer readable instructions received from a computer program. It will be understood that the units illustrated in FIG. 8 are functional units, and may be realised in any appropriate combination of hardware and/or software. The units may comprise one or more processors and may be integrated to any degree.

Referring to FIG. 8, the device 800 comprises a request module 802 for requesting a Bootstrap data object from a node reachable via the network, the Bootstrap data object comprising an identification of a device management server. The device further comprises a receiving module 804 for receiving a Bootstrap data object from a node reachable via the network and a configuring module 806 for configuring a data object on the device in accordance with the received Bootstrap data object. The request module 802 is also for requesting registration with the device management server identified in the received Bootstrap data object. The device also comprises interfaces 808. The term module may have conventional meaning in the field of electronics, electrical devices and/or electronic devices and may include, for example, electrical and/or electronic circuitry, devices, processors, processing circuitry, memories, logic, solid state and/or discrete devices, computer programs or instructions for carrying out respective tasks, procedures, computations, outputs, and/or displaying functions, and so on, as such as those that are described in the present disclosure.

Figure 9:
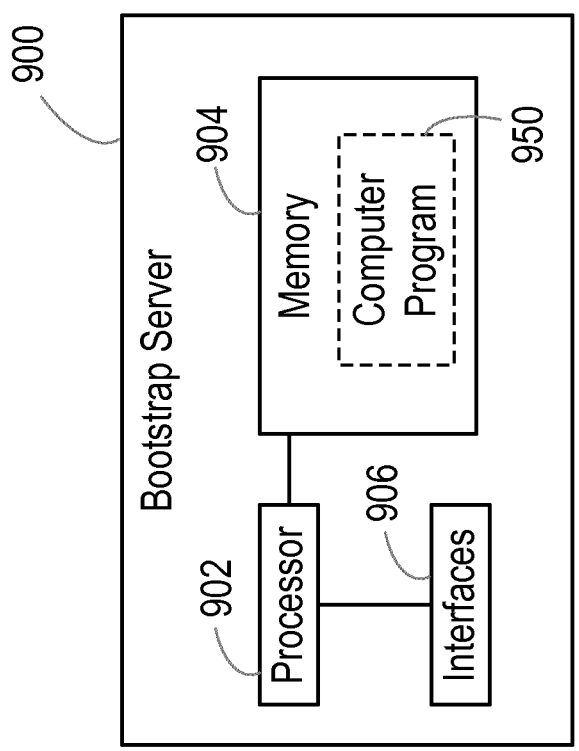
FIG. 9 is a block diagram illustrating functional units in a Bootstrap server.

As discussed above, the method 300 may be performed by a Bootstrap server, which may in some examples be a LWM2M Bootstrap server. FIG. 9 is a block diagram illustrating an example Bootstrap server 900 which may implement the method 300 according to examples of the present disclosure, for example on receipt of suitable instructions from a computer program 950. Referring to FIG. 9, the Bootstrap server 900 comprises a processor or processing circuitry 902, a memory 904 and interfaces 906. The memory 904 contains instructions executable by the processor 902 such that the Bootstrap server 900 is operative to conduct some or all of the steps of the method 300. The instructions may also include instructions for executing one or more telecommunications and/or data communications protocols. The instructions may be stored in the form of the computer program 950. In some examples, the processor or processing circuitry 902 may include one or more microprocessors or microcontrollers, as well as other digital hardware, which may include digital signal processors (DSPs), special-purpose digital logic, etc. The processor or processing circuitry 902 may be implemented by any type of integrated circuit, such as an Application Specific Integrated Circuit (ASIC), Field Programmable Gate Array (FPGA) etc. The memory 904 may include one or several types of memory suitable for the processor, such as read-only memory (ROM), random-access memory, cache memory, flash memory devices, optical storage devices, solid state disk, hard disk drive etc.

Figure 10:
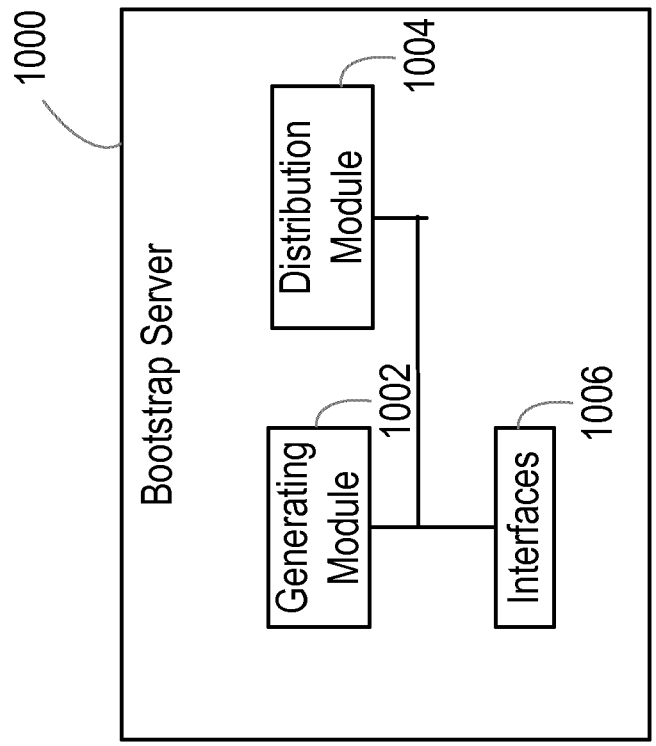
FIG. 10 is a block diagram illustrating functional units in another example of Bootstrap server.

FIG. 10 illustrates functional units in another example of Bootstrap server 1000 which may execute examples of the method 300 of the present disclosure, for example according to computer readable instructions received from a computer program. It will be understood that the units illustrated in FIG. 10 are functional units, and may be realised in any appropriate combination of hardware and/or software. The units may comprise one or more processors and may be integrated to any degree.

Referring to FIG. 10, the Bootstrap server 1000 comprises a generating module 1002 for generating a Bootstrap data object corresponding to a device that is operable to connect to a network, the Bootstrap data object comprising an identification of a device management server. The Bootstrap server 1000 further comprises a distribution module 1004 for distributing the generated Bootstrap data object to a node reachable via the network. The Bootstrap server 1000 also comprises interfaces 1006. The term module may have conventional meaning in the field of electronics, electrical devices and/or electronic devices and may include, for example, electrical and/or electronic circuitry, devices, processors, processing circuitry, memories, logic, solid state and/or discrete devices, computer programs or instructions for carrying out respective tasks, procedures, computations, outputs, and/or displaying functions, and so on, as such as those that are described in the present disclosure.

Figure 11:
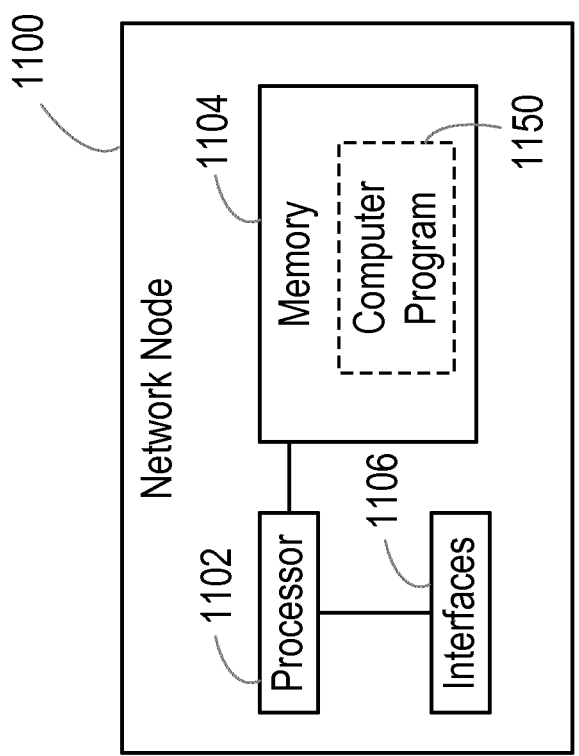
FIG. 11 is a block diagram illustrating functional units in a network node.

As discussed above, the method 400 may be performed by a network node, which may in some examples be a Bootstrap server proxy or cache node, a generic file server or a device such as a constrained device. FIG. 11 is a block diagram illustrating an example network node 1100 which may implement the method 400 according to examples of the present disclosure, for example on receipt of suitable instructions from a computer program 1150. Referring to FIG. 11, the network node 1100 comprises a processor or processing circuitry 1102, a memory 1104 and interfaces 1106. The memory 1104 contains instructions executable by the processor 1102 such that the network node 1100 is operative to conduct some or all of the steps of the method 400. The instructions may also include instructions for executing one or more telecommunications and/or data communications protocols. The instructions may be stored in the form of the computer program 1150. In some examples, the processor or processing circuitry 1102 may include one or more microprocessors or microcontrollers, as well as other digital hardware, which may include digital signal processors (DSPs), special-purpose digital logic, etc. The processor or processing circuitry 1102 may be implemented by any type of integrated circuit, such as an Application Specific Integrated Circuit (ASIC), Field Programmable Gate Array (FPGA) etc. The memory 1104 may include one or several types of memory suitable for the processor, such as read-only memory (ROM), random-access memory, cache memory, flash memory devices, optical storage devices, solid state disk, hard disk drive etc.

Figure 12:
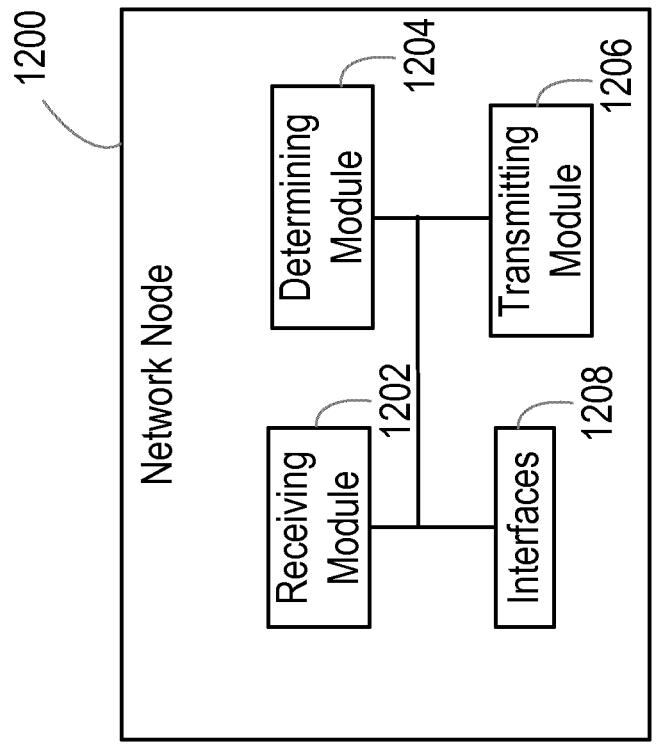
FIG. 12 is a block diagram illustrating functional units in another example of network node.

FIG. 12 illustrates functional units in another example of network node 1200 which may execute examples of the method 400 of the present disclosure, for example according to computer readable instructions received from a computer program. It will be understood that the units illustrated in FIG. 12 are functional units, and may be realised in any appropriate combination of hardware and/or software. The units may comprise one or more processors and may be integrated to any degree.

Referring to FIG. 12, the network node 1200 comprises a receiving module 1202 for receiving a request for a Bootstrap data object from a device operable to connect to a network. The network node 1200 further comprises a determining module 1204 for determining whether a Bootstrap data object corresponding to the device is available on the network node, and a transmitting module 1206 for, if a Bootstrap data object corresponding to the device is available on the network node, sending the Bootstrap data object corresponding to the device to the device, the Bootstrap data object comprising an identification of a device management server. The network node 1200 also comprises interfaces 1208. The term module may have conventional meaning in the field of electronics, electrical devices and/or electronic devices and may include, for example, electrical and/or electronic circuitry, devices, processors, processing circuitry, memories, logic, solid state and/or discrete devices, computer programs or instructions for carrying out respective tasks, procedures, computations, outputs, and/or displaying functions, and so on, as such as those that are described in the present disclosure.

Aspects and examples of the present disclosure thus provide methods and apparatus that may enable a device to Bootstrap on a network without a direct message exchange with a Bootstrap server. A Bootstrap data object, which may be secured, is generated containing an identification of a device management server for a device, the Bootstrap data object may contain additional configuration information for the device, and/or for a device management client, such as a LWM2M client running on the device, as well as prerequisites for applying the configuration, and key material.

A device may retrieve a Bootstrap data object from any source that is able to deliver it, and a Bootstrap data object may be distributed among various cache, proxy, file server and/or peer device nodes. A device may use multicast to discover locally served Bootstrap data objects. The Bootstrap data object may be signed and/or may be encrypted by a Bootstrap server using object security, so ensuring that a device may retrieve the Bootstrap data object even from untrusted sources.

Examples of the present disclosure thus provide an optimization for a Bootstrap procedure, such as a LWM2M Bootstrap procedure, according to which information conveyed during a conventional Bootstrap process via multiple message flights may be packaged in a single Bootstrap data object. Examples of the present disclosure may decrease the number messages in flight considerably, freeing up network bandwidth and representing a significant advantage for constrained devices, for which using the radio network is resource-consuming and expensive. Examples of the present disclosure also decrease the load on a Bootstrap server, saving energy at the Bootstrap server and allowing the distribution of Bootstrap data objects between network nodes, relaxing constraints on device—Bootstrap server access and so simplifying device deployments as well as the scaling of Bootstrap server infrastructure.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of operating a lightweight machine to machine (LwM2M) device that is operable to connect to a network, the method comprising:
   requesting a Bootstrap data object from a LwM2M network node reachable via the network, the Bootstrap data object comprising an identification of a LwM2M device management server and configuration information, wherein the Bootstrap data object is requested by the LwM2M device without direct contact with a Bootstrap server, and wherein the LwM2M network node is separate from the Bootstrap server and has been previously provisioned with the Bootstrap data object by the Bootstrap server;
   receiving, by the LwM2M device, the Bootstrap data object from the LwM2M network node without direct contact with the Bootstrap server, wherein the Bootstrap data object further comprises a representation of a prerequisite object configuration;

responsive to determining that the representation of the prerequisite object configuration matches a representation of an existing object configuration stored on the LwM2M device, configuring at least one of a plurality of data objects on the LwM2M device in accordance with the Bootstrap data object; and requesting registration with the LwM2M device management server identified in the Bootstrap data object.

2. The method of claim 1, wherein configuring the data object comprises writing the identification of the LwM2M device management server as a value of the data object on the LwM2M device.

3. The method of claim 2, wherein the Bootstrap data object further comprises an object specification describing at least one of an object structure and object resource values, and wherein configuring the data object comprises at least one of:
creating the data object on the device having the described object structure;
writing the described object resource values into the data object on the LwM2M device.

4. The method of claim 3, wherein the Bootstrap data object further comprises at least one of:
security credentials for the LwM2M device management server; and
an indication of how the security credentials may be obtained,
wherein configuring the data object comprises writing the security credentials for the LwM2M device management server as a value of the data object on the LwM2M device, and
wherein requesting registration with the LwM2M device management server comprises requesting registration using the security credentials for the LwM2M device management server.

5. The method of claim 4, further comprising:
obtaining an address of the LwM2M network node provisioned with the Bootstrap data object,
wherein requesting the Bootstrap data object comprises sending a request message to the address, and
wherein obtaining the address of the LwM2M network node provisioned with the Bootstrap data object comprises at least one of:
retrieving a dedicated multicast address for Bootstrap data object provisioned LwM2M network nodes from a memory;
querying a Resource Directory for LwM2M network nodes having exposed the Bootstrap data object as a discoverable resource.

6. The method of claim 5, wherein the LwM2M network node comprises at least one of:
a Bootstrap Server cache;
a Bootstrap server proxy node;
a file server; and
a peer client device.

7. The method of claim 6, wherein requesting the Bootstrap data object comprises sending a Bootstrap data object request message to the LwM2M network node, the Bootstrap data object request message comprising a characteristic of the LwM2M device, the characteristic comprising at least one of:
a device type;
a device identifier;
a representation of device capabilities; and
a representation of data objects configured on the LwM2M device.

8. The method of claim 7, wherein the Bootstrap data object further comprises a representation of a prerequisite object configuration that should be existing on the LwM2M device before configuration of the data object on the LwM2M device in accordance with the Bootstrap data object, the method further comprising:
comparing a representation of an existing object configuration on the LwM2M device with the representation of the prerequisite object configuration.

9. The method of claim 8, further comprising at least one of:
responsive to determining that the representation of the existing object configuration and the representation of the prerequisite object configuration are a match, configuring the data object on the LwM2M device in accordance with the Bootstrap data object; and
responsive to determining that the representation of the existing object configuration and the representation of the prerequisite object configuration are not a match, performing at least one of:
requesting a new Bootstrap data object from a second LwM2M network node reachable via the network;
sending a Bootstrapping request to a LwM2M Bootstrapping Server,
wherein requesting the new Bootstrapping data object from the second LwM2M network node comprises at least one of:
obtaining an address of the second LwM2M network node provisioned with the new Bootstrap data object and sending a second request message to the address of the second LwM2M network node; and
sending a second Bootstrap data object request message, the second Bootstrap data object request message comprising a different characteristic of the LwM2M device.

10. The method of claim 9, wherein the representation of the prerequisite object configuration comprises at least one of:
a representation of data objects that must exist on the LwM2M device; and
a representation of data objects that must not exist on the LwM2M device,
wherein the representation of the existing object configuration and/or the representation of the prerequisite object configuration comprises at least one of:
a checksum; and
a bloom filter.

11. The method of claim 10, wherein determining that the representation of the existing object configuration and the representation of the prerequisite object configuration are a match comprises determining a similarity between the representation of the existing object configuration on the LwM2M device and the representation of the prerequisite object configuration is above a threshold level.

12. The method of claim 11, further comprising:
subsequent to requesting the Bootstrap data object, checking for a request failure condition, the request failure condition comprising at least one of receipt of a message indicating that no Bootstrap data object is available and expiry of a request timer;
responsive to determining the request failure condition has occurred, performing at least one of:
requesting a new Bootstrap data object from a second LwM2M network node reachable via the network;
sending a Bootstrapping request to a LwM2M Bootstrapping Server.

13. The method of claim 1, wherein the network node is separate from a LwM2M Bootstrap server, which is separate from the LwM2M device management server.

14. A method for operating a Bootstrap server, the method comprising:

generating a Bootstrap data object corresponding to a device that is operable to connect to a network, the Bootstrap data object comprising an identification of a device management server that is to be assigned to the device, wherein the Bootstrap data object further comprises a representation of a prerequisite object configuration; and prior to the device connecting to the network, distributing the Bootstrap data object to a network node reachable via the network, the network node being separate from the device, the Bootstrap server, any other Bootstrap server, and the device management server, wherein a request for the Bootstrap data object is sent to the network node by the device without direct contact between the Bootstrap server and the device, wherein the Bootstrap data object is received by the device from the network node without direct contact between the Bootstrap server and the device, and wherein responsive to determining that the representation of the prerequisite object configuration matches a representation of an existing object configuration stored on the device, the device configures at least one of a plurality of data objects on the device in accordance with the Bootstrap data object.

15. The method of claim 14, wherein the Bootstrap data object further comprises an object specification describing at least one of an object structure and object resource values for configuration of a data object on the device, wherein the Bootstrap data object further comprises at least one of:

security credentials for the device management server; and an indication of how security credentials for the device management server may be obtained.

16. The method of claim 15, wherein the network node comprises Bootstrap server proxy node, and wherein generating the Bootstrap data object comprises labelling the Bootstrap data object with a characteristic of the device, wherein the characteristic comprises at least one of:

a device type;

a device identifier;

a representation of device capabilities; and a representation of data objects configured on the device.

17. The method of claim 16, wherein the Bootstrap data object further comprises a representation of a prerequisite object configuration that should be existing on the device before configuration of the data object on the device in accordance with the Bootstrap data object, wherein the representation of the prerequisite object configuration comprises at least one of:

a representation of data objects that must exist on the device; and a representation of data objects that must not exist on the device.

18. The method of claim 14, wherein the network node is separate from the Bootstrap server and the device, the Bootstrap server being separate from the device management server.

19. A method for operating a network node, the method comprising:

receiving a Bootstrap data object from a Bootstrap server that is separate from the network node, the Bootstrap data object corresponding to a device and including an identification of a device management server;

receiving, by the network node, a request for the Bootstrap data object from the device operable to connect to a network, wherein the request for the Bootstrap data object is received from the device without direct contact between the Bootstrap server and the device;

determining that the Bootstrap data object corresponding to the device is available on the network node; and responsive to determining that the Bootstrap data object is available on the network node, sending the Bootstrap data object to the device, wherein the Bootstrap data object further comprises a representation of a prerequisite object configuration; and responsive to determining that the representation of the prerequisite object configuration matches a representation of an existing object configuration stored on the device, the device configures at least one of a plurality of data objects on the device in accordance with the Bootstrap data object, wherein the Bootstrap data object is received by the device without direct contact between the Bootstrap server and the device.

20. The method of claim 19, further comprising:

exposing the Bootstrap data object to a Resource Directory as a discoverable resource.

21. The method of claim 19, wherein the Bootstrap data object is a first Bootstrap data object and the device is a first device, the method further comprising:

receiving a request for a second Bootstrap data object from a second device operable to connect to the network;

determining whether the second Bootstrap data object corresponding to the second device is available at on the network node; and responsive to the second Bootstrap data object not being available on the network node, performing at least one of:

ignoring the request;

sending a message to the device indicating that no Bootstrap data object is available; and forwarding the request.

22. The method of claim 21, wherein the request for the second Bootstrap data object comprises a Bootstrap data object request message including a characteristic of the second device, wherein determining that the second Bootstrap data object is available on the network node comprises determining that a Bootstrap data object having a label that matches the received characteristic is stored on the network node, wherein the characteristic comprises at least one of:

a device type;

a device identifier;

a representation of device capabilities; and a representation of data objects configured on the second device, and wherein the network node comprises a file server.

23. The method of claim 19, wherein the network node is separate from a Bootstrap server, which is separate from the device management server, and wherein the network node is separate from the device.

24. A device that is operable to connect to a network, the device comprising:
a processor; and
a memory coupled to the processor and having instructions stored therein that are executable by the processor to cause the device to perform operations comprising:
requesting a Bootstrap data object from a network node reachable via the network, the Bootstrap data object comprising an identification of a device management server and configuration information, wherein the Bootstrap data object is requested from the network node by the LwM2M device without direct contact with a Bootstrap server, and wherein the network node is separate from the Bootstrap server and is previously provisioned with the Bootstrap data object by the Bootstrap server;
receiving the Bootstrap data object from the network node without direct contact with the Bootstrap server, wherein the Bootstrap data object further comprises a representation of a prerequisite object configuration;
responsive to determining that the representation of the prerequisite object configuration matches a representation of an existing object configuration stored on the device, the device configures at least one of a plurality of data objects on the device in accordance with the Bootstrap data object; and
requesting registration with the management server identified in the Bootstrap data object.

25. A Bootstrap server comprising:
a processor; and
a memory coupled to the processor and having instructions stored therein that are executable by the processor to cause the device to perform operations comprising:
generating a Bootstrap data object corresponding to a device that is operable to connect to a network, the Bootstrap data object comprising an identification of a device management server that is to be assigned to the device, wherein the Bootstrap data object further comprises a representation of a prerequisite object configuration; and
prior to the device connecting to the network, distributing the Bootstrap data object to a network node reachable via the network, the network node being separate from the device, the Bootstrap server, any other Bootstrap server, and the device management server, wherein the Bootstrap data object is sent to the device by the network node without direct contact between the Bootstrap server and the device, and wherein responsive to determining that the representation of the prerequisite object configuration matches a representation of an existing object configuration stored on the device, the device configures at least one of a plurality of data objects on the device in accordance with the Bootstrap data object.

26. A network node, the network node comprising:
a processor; and
a memory coupled to the processor and having instructions stored therein that are executable by the processor to cause the device to perform operations comprising:
receiving a Bootstrap data object from a Bootstrap server that is separate from the network node, the bootstrap data object corresponding to a device and including an identification of a device management server;
receiving a request for the Bootstrap data object from a device operable to connect to a network, wherein the request for the Bootstrap data object is received from the device without direct contact between the Bootstrap server and the device, and;
determining that the Bootstrap data object is available on the network node; and
responsive to determining that the Bootstrap data object is available on the network node, sending the Bootstrap data object to the device, wherein the Bootstrap data object further comprises a representation of a prerequisite object configuration; and
responsive to determining that the representation of the prerequisite object configuration matches a representation of an existing object configuration stored on the device, the device configures at least one of a plurality of data objects on the device in accordance with the Bootstrap data object, wherein the Bootstrap data object is sent to the device without direct contact between the Bootstrap server and the device.

* * * * *